United States Patent
Yu et al.

(10) Patent No.: US 9,763,110 B2
(45) Date of Patent: Sep. 12, 2017

(54) METHOD AND SYSTEM FOR MOBILE RELAY ENABLEMENT

(71) Applicant: BlackBerry Limited, Waterloo (CA)

(72) Inventors: Yi Yu, Irving, TX (US); Zhijun Cai, Euless, TX (US); Yi Song, Plano, TX (US); Yufei Wu Blankenship, Kildeer, IL (US); Chandra Sekhar Bontu, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 632 days.

(21) Appl. No.: 13/673,474

(22) Filed: Nov. 9, 2012

(65) Prior Publication Data

US 2014/0134942 A1 May 15, 2014

Related U.S. Application Data

(63) Continuation of application No. PCT/US2011/060477, filed on Nov. 11, 2011.

(51) Int. Cl.
H04B 7/15 (2006.01)
H04B 7/14 (2006.01)
H04B 17/02 (2006.01)
H04W 24/02 (2009.01)
H04W 84/00 (2009.01)
H04W 84/04 (2009.01)

(52) U.S. Cl.
CPC .............. *H04W 24/02* (2013.01); *H04B 7/15* (2013.01); *H04W 84/005* (2013.01); *H04W 84/047* (2013.01)

(58) Field of Classification Search
CPC ..................................................... H04W 88/04
USPC ......................................... 455/436, 439, 440
See application file for complete search history.

(56) References Cited

U.S. PATENT DOCUMENTS

| | | | |
|---|---|---|---|
| 5,574,968 A | 11/1996 | Olds et al. | |
| 6,157,834 A | 12/2000 | Helm et al. | |
| 6,253,080 B1 | 6/2001 | Wiedeman et al. | |
| 6,259,915 B1 | 7/2001 | Raith | |
| 6,370,126 B1 | 4/2002 | De Baere et al. | |
| 8,843,058 B2 * | 9/2014 | Senarath et al. ............. 455/11.1 | |
| 9,473,952 B2 * | 10/2016 | Yu ..................... H04W 36/0077 | |
| 2002/0039900 A1 | 4/2002 | Wiedeman et al. | |

(Continued)

FOREIGN PATENT DOCUMENTS

| | | |
|---|---|---|
| WO | 2008084394 A2 | 7/2008 |
| WO | 2008137328 A2 | 11/2008 |

(Continued)

OTHER PUBLICATIONS

Office Action dated Sep. 9, 2014; U.S. Appl. No. 13/673,384, filed Nov. 9, 2012; 25 pages.

(Continued)

*Primary Examiner* — Tilahun B Gesesse
(74) *Attorney, Agent, or Firm* — Conley Rose, P.C.; J. Robert Brown, Jr.

(57) ABSTRACT

A method and relay node for managing a plurality of relay nodes that is moving relative to a source network node, the method comprising: selecting a lead node; connecting the plurality of relay nodes to the lead node; and transmitting a signal to manage mobility of the plurality of relay nodes from the lead node to a network node.

14 Claims, 19 Drawing Sheets

(56) References Cited

U.S. PATENT DOCUMENTS

| | | | |
|---|---|---|---|
| 2007/0249347 A1 | 10/2007 | Saifullah et al. | |
| 2008/0267127 A1 | 10/2008 | Narasimha et al. | |
| 2009/0156219 A1 | 6/2009 | Kim et al. | |
| 2010/0022250 A1 | 1/2010 | Petrovic et al. | |
| 2010/0061339 A1 | 3/2010 | Kim et al. | |
| 2010/0272067 A1 | 10/2010 | Lu et al. | |
| 2011/0103347 A1 | 5/2011 | Dimou | |
| 2012/0044859 A1* | 2/2012 | Hapsari | H04W 36/0016 370/315 |
| 2012/0087298 A1 | 4/2012 | Garavaglia et al. | |
| 2012/0231797 A1 | 9/2012 | Van Phan et al. | |
| 2012/0252355 A1* | 10/2012 | Huang | H04W 36/0033 455/7 |
| 2013/0051309 A1 | 2/2013 | Van Phan et al. | |
| 2013/0163508 A1 | 6/2013 | Yu et al. | |
| 2013/0250771 A1 | 9/2013 | Yu et al. | |
| 2014/0134942 A1* | 5/2014 | Yu | H04W 24/02 455/7 |

FOREIGN PATENT DOCUMENTS

| | | |
|---|---|---|
| WO | 2011110229 A1 | 9/2011 |
| WO | 2012037958 A1 | 3/2012 |

OTHER PUBLICATIONS

Office Action dated Sep. 3, 2014; U.S. Appl. No. 13/673,414, filed Nov. 9, 2012; 26 pages.
Office Action dated Sep. 3, 2014; U.S. Appl. No. 13/673,439, filed Nov. 9, 2012; 18 pages.
Yu, Yi, et al.; U.S. Appl. No. 13/673,384, filed Nov. 9, 2012; Title: Method and System for Mobile Relay Enablement.
Yu, Yi, et al.; U.S. Appl. No. 13/673,414, filed Nov. 9, 2012; Title: Method and System for Mobile Relay Enablement.
Yu, Yi, et al.; U.S. Appl. No. 13/673,439, filed Nov. 9, 2012; Title: Method and System for Mobile Relay Enablement.
Notice of Allowance dated Jan. 29, 2016; U.S. Appl. No. 13/673,384, filed Nov. 9, 2012; 15 pages.
Office Action dated Nov. 17, 2015; U.S. Appl. No. 13/673,439, filed Nov. 9, 2012; 20 pages.
Yu, Yi, et al.; U.S. Appl. No. 15/251,853, filed Aug. 30, 2016; Title: Method and Relay Node for Mobile Relay Enablement; 75 pages.
Final Office Action dated Nov. 13, 2015; U.S. Appl. No. 13/673,384, filed Nov. 9, 2012; 18 pages.
Advisory Action dated Aug. 14, 2015; U.S. Appl. No. 13/673,439, filed Nov. 9, 2012; 6 pages.
3GPP TR 36.912 version 10.0.0 Release 10: "Feasibility study for Further Advancements for E-UTRA (LTE-Advanced)" (Apr. 2011), 63 pages.
3GPP TR 36.806 v2.0.0 Release 9: "Relay architectures for E-UTRA (LTE-Advanced)" (Feb. 2010), 35 pages.
RP-110675, "New Study Item Proposal: Mobile Relay for E-UTRA", CATT, CMCC, CATR, China Telecom, 3GPP TSG RAN#52, Bratislava, Slovakia, May 31-Jun. 3, 2011, 9 pages.
3GPP TS 36.413 version 10.2.0 Release 10: "Evolved Universal Terrestrial Radio Access Network (E-UTRAN); S1 Application Protocol (S1AP)" (Jun. 2011), 255 pages.
3GPP TS 36.423 version 10.2.0 Release 10: "Evolved Universal Terrestrial Radio Access Network (E-UTRAN); X2 Application Protocol (X2AP)" (Jun. 2011), 130 pages.
PCT application No. PCT/US2011/060473, International Search Report and Written Opinion of the International Searching Authority, mailed Jun. 6, 2012, 13 pages.
Institute for Information Industry (III) et al: "Handover Procedures for Mobile RN", 3GPP Draft; R3-112619, 3rd Generation Partnership Project (3GPP), Mobile Competence Centre; 650, Route Des Lucioles; F-06921 Sophia-Antipolis Cedex; France, vol. RAN WG3, No. Zhuhai; 20111010, Oct. 1, 2011, XP050542310, [retrieved on Oct. 1, 2011], 4 pages.
Huawei et al: DeNB and MME Selection, 3GPP Draft; R3-102042 DeNB and MME Selection, 3rd Generation Partnership Project (3GPP), Mobile Competence Centre; 650, Route Des Lucioles; F-06921 Sophia-Antipolis Cedex; France, vol. RAN WG3, No. Madrid, Spain; 20100823, Aug. 15, 2010 (Aug. 15, 2010), XP050452935, 6 pages.
Research in Motion et al: "Joint PDCP protocols in a relay handover under different relay architectures", 3GPP Draft; R2-095834, 3rd Generation Partnership Project (3GPP), Mobile Competence Centre; 650, Route Des Lucioles; Sophia-Antipolis Cedex; France, no. Miyazaki; 20091012, Oct. 12, 2009 (Oct. 12, 2009), XP050390312, especially, section 3.2 figures 5, 7, 6 pages.
Institute for Information Industry (III) et al: "Timing of Source DeNB releasing RN context for RN mobility", 3GPP Draft; R3-112620, 3rd Generation Partnership Project (3GPP), Mobile Competence Centre; 650, Route Des Lucioles, F-06921 Sophia-Antipolis Cedex; France, vol. RAN WG3, No. Zhuhai; 20111010, Oct. 1, 2011 (Oct. 1, 2011), XP050542311, especially figure 6, 6 pages.
PCT application No. PCT/US2011/060475, International Search Report and Written Opinion of the International Searching Authority, mailed Jun. 14, 2012, 12 pages.
PCT application No. PCT/US2011/060476, International Search Report and Written Opinion of the International Searching Authority, mailed Aug. 9, 2012, 20 pages.
PCT application No. PCT/US2011/060477, International Search Report and Written Opinion of the International Searching Authority, mailed Jun. 6, 2012, 12 pages.
Teyeb O. et al: "Dynamic Relaying in 3GPP LTE-Advanced Networks", Eurasip Journal on Wireless Communications and Networking, Hindawi Publishing Corporation, New York, NY, US, vol. 2009, No. Art. ID 731317, Jan. 1, 2009 (Jan. 1, 2009), pp. 1-11, XP002572643, ISSN: 1687-1472, DOIL 10.1155/2009/731317, especially section 3 figure 3, 11 pages.
Min Lee et al: "Fast handover scheme using handover notification with no acknowledgement", Intelligent Radio for Future Personal Terminals (IMWS-IRFPT), 2011 IEEE MTTS-S International Microwave Workshop Series on, IEEE, Aug. 24, 2011 (Aug. 24, 2011), pp. 1-3, XP032053399, DOI: 10.1109/IMWS2.2011. 6027177 ISBN: 978-1-4577-0961-6 section III and IV; figure 2, 3 pages.
Cali: "Discussion on Mobile Relay Architectures", 3GPP Draft; R3-112401, 3rd Generation Partnership Project (3GPP), Mobile Competence Centre; 650, Route Des Lucioles; F-06921 Sophia-Antipolis Cedex; France, vol. RAN WG3, No. Zhuhai; 20111010, Sep. 30, 2011 (Sep. 30, 2011), XP050542088, section 2, first paragraph; section 2.2., subsection 2, 5 pages.
Teyeb O. et al: "Handover Framework for Relay Enhancement LTE Networks", Communications Workshop 2009. IEEE International Conference on, IEEE, Piscataway, NJ, USA, Jun. 14, 2009 (Jun. 14, 2009), pp. 1-5, XP031515443, ISBN: 978-1-4244-3437-4 section IV, 5 pages.
Final Office Action dated Jan. 7, 2015; U.S. Appl. No. 13/673,384, filed Nov. 9, 2012; 25 pages.
Notice of Allowance dated Jan. 21, 2015; U.S. Appl. No. 13/673,414, filed Nov. 9, 2012; 9 pages.
Office Action dated Dec. 18, 2014; U.S. Appl. No. 13/673,439, filed Nov. 9, 2012; 24 pages.
Office Action dated Jun. 26, 2015; U.S. Appl. No. 13/673,384, filed Nov. 9, 2012; 19 pages.
Final Office Action dated May 15, 2015; U.S. Appl. No. 13/673,439, filed Nov. 9, 2012; 19 pages.
Final Office Action dated Apr. 18, 2016; U.S. Appl. No. 13/673,439, filed Nov. 9, 2012; 19 pages.
Notice of Allowance dated Jul. 7, 2016; U.S. Appl. No. 13/673,439, filed Nov. 9, 2012; 11 pages.

* cited by examiner

METHOD AND SYSTEM FOR MOBILE RELAY ENABLEMENT

FIELD OF THE DISCLOSURE

The present disclosure relates to relays and in particular relates to mobile relays.

BACKGROUND

Relay technology has been adopted in various mobile networks in an effort to extend cell coverage and enhance system capacity. For example, such relay technology has been adopted in Third Generation Partnership Project (3GPP) Long Term Evolution-Advanced (LTE-A) Release 10 systems.

In one embodiment, the relay node (RN) has its own cell identifier (ID) and is wirelessly connected to a serving evolved node B (eNB), referred to herein as the Donor eNB (DeNB), via the Un interface. In order to support RNs in a network, various network architectures may allow an S1, X2 and Un interface to be terminated at the RN.

Such architectures generally presuppose a stationary RN wirelessly connected with the DeNB. However, in certain cases the RN may be mobile. For example, on a train, one or more RNs may be deployed to allow mobile devices to connect to the RN. However, the RN is itself is moving with reference to the DeNB(s).

BRIEF DESCRIPTION OF THE DRAWINGS

The present disclosure will be better understood with reference to the drawings, in which.

DETAILED DESCRIPTION OF THE DRAWINGS

Figure 1:
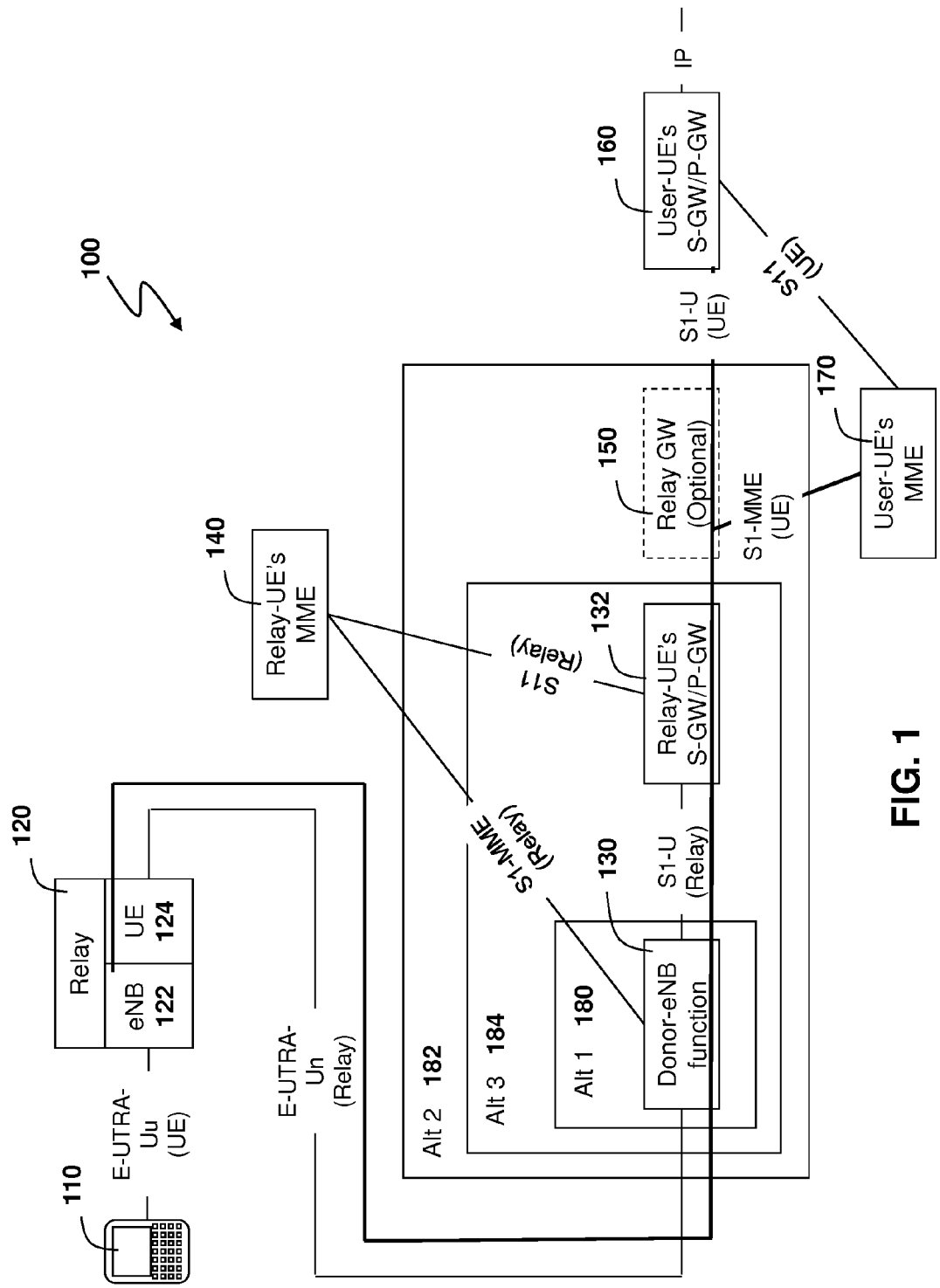
FIG. 1 is a block diagram showing various architectures for mobile relays.

The present disclosure provides a method for managing a relay node that is moving relative to a source network node, the method comprising: ensuring a target network node is capable of supporting the relay node; sending a handover request of a relay node from the source network node to the target network node; and establishing an interface between the relay node and the target network node.

The present disclosure further provides a source network node configured for managing a relay node that is moving relative to the source network node, the source network node comprising: a processor; and a communications subsystem, wherein the processor and communications subsystem cooperate to: ensure a target network node is capable of supporting the relay node; send a handover request of a relay node from the source network node to the target network node; and establish an interface between the relay node and the target network node.

The present disclosure further provides a method for managing a relay node that is moving relative to a source network node, the method comprising: sending a handover request from the source network node to a target network node to prepare the handover at the target network node; sending a handover command from the source network node to the relay node without waiting for an acknowledgement of the handover request from the target network node; and detaching the relay node from the source network node.

The present disclosure further provides a source network node configured for managing a relay node that is moving relative to the source network node, the source network node comprising: a processor; and a communications subsystem, wherein the processor and communications subsystem cooperate to: send a handover request from the source network node to a target network node to prepare the handover at the target network node; send a handover command from the source network node to the relay node without waiting for an acknowledgement of the handover request from the target network node; detach the relay node from the source network node.

The present disclosure further provides a method for managing a relay node that is moving relative to a source network node, the method comprising: receiving parameters of a target network node from the source network node at the relay node; initiating a direct attachment of the relay node to the target network node; and detaching the relay node from the source network node.

The present disclosure further provides a relay node configured to move relative to a source network node, the relay node comprising: a processor; and a communications subsystem, wherein the processor and communications subsystem cooperate to: receive parameters of a target network node from the source network node at the relay node; initiate a direct attachment of the relay node to the target network node; and detach the relay node from the source network node.

The present disclosure further provides a method for managing a relay node that is moving relative to a source network node, the method comprising: sending a handover request of a relay node from the source network node to a target network node; performing handover of a plurality of user equipments (UEs) from the source network node to the target network node, wherein the plurality of UEs are attached to the relay node, and establishing an interface between the relay node and the target network node.

The present disclosure further provides a source network node configured for managing a relay node that is moving relative to the source network node, the source network node comprising: a processor; and a communications subsystem, wherein the processor and communications subsystem cooperate to: send a handover request of a relay node from the source network node to a target network node; perform handover of a plurality of user equipments (UEs) from the source network node to the target network node, wherein the plurality of UEs are attached to the relay node, and establish an interface between the relay node and the target network node.

The present disclosure further provides a method for managing a relay node that is moving relative to a source network node, the method comprising: selecting a lead node; connecting the plurality of relay nodes to the lead node; and transmitting a signal to manage mobility of the plurality of relay nodes from the lead node to a network node.

The present disclosure further provides a relay node configured to move relative to a source network node, the relay node comprising: a processor; and a communications subsystem, wherein the processor and communications subsystem cooperate to: select a lead node; connect the plurality of relay nodes to the lead node; and transmit a signal to manage mobility of the plurality of relay nodes from the lead node to a network node.

The embodiments of the present disclosure are provided with regard to 3GPP LTE-Advanced. However, this is merely meant to be exemplary. Similar embodiments are possible with different types of networks and the use of 3GPP LTE-Advanced is merely meant for illustration purposes.

In current 3GPP LTE-Advanced systems, various relay architectures have been proposed. These are described below as Architecture A, having three variants, and Architecture B having a fourth variant.

References now made to FIG. 1, which shows Architecture A and the various alternatives in Architecture A.

In particular, in Architecture 100 of FIG. 1 a user UE 110 (also called "user-UE" in the following) communicates with a relay 120. In the embodiments of FIG. 1, relay 120 can be seen to be both an eNB to user UE 110 and as a UE to the remainder of the network architecture 100, shown by eNB 122 and UE 124 (also called "relay-UE" in the following).

Relay 120 communicates with DeNB function 130, which then communicates with the relay-UEs serving gateway (S-GW) and packet data node (PDN) gateway (P-GW) 132. Depending on the implementation, DeNB function 130 may also include relay-UEs serving gateway (S-GW) and packet data node (PDN) gateway (P-GW) 132 functionalities.

The DeNB function 130 also communicates with the relay-UE's mobility management entity (MME) 140.

The relay-UE's S-GW/P-GW 132 optionally communicates with a relay gateway 150 and with the user-UE's S-GW/P-GW 160. Further, the relay-UE's S-GW/P-GW 132 also communicates with user-UE's MME 170.

The alternative 1 to Architecture A, shown by box 180, the DeNB only has the eNB function (it does not function as S-GW/P-GW for the relay-UEs). The alternative 1, relay node is a "full L3 type relay", whose S1 interface and the signaling connections are routed through the DeNB transparently.

In a third alternative, shown by box 184, the baseline solution of the alternative 1 is enhanced by integrating the S-GW/P-GW functionality for the Relay-UEs (132) into the DeNB.

In a second alternative, shown by box 182, the DeNB is enhanced to include the functionality of the Donor eNB, the relay-UEs S-GW/P-GW 132 and the relay gateway 150 S-GWP-GW. This results in the "Proxy S1/X2" architecture.

Each of all alternatives 1, 2 and 3 have their own characteristics. The different characteristics affect the underlying base RN procedures and in particular relate to how mobility how can occur for the RN. Thus, each architecture is more fully described below.

Alternative 1: Full-L3 Relay, Transparent for DeNB

Both the user plane (U-plane) and the control plane (C-plane) of the S1 interface are terminated at the RN. U-plane packets of a user equipment (UE) served by the RN are delivered via the relays P-GW/S-GW and the relays radio bearers.

From a UE perspective, the relay is a serving eNB of the UE. The UEs S-GW/P-GW maps the incoming IP packets to the general packet radio service (GPRS) tunneling protocol (GTP) corresponding to the evolved packet system (EPS) bearer of the UE and tunnels the packets to IP address of the RN. The tunneled packets are routed to the RN via the relay's P-GW/S-GW. EPS bearers of different UEs connected to the RN with similar quality of service (QoS) are mapped in one relay radio bearer over the Un interface.

Figure 2:
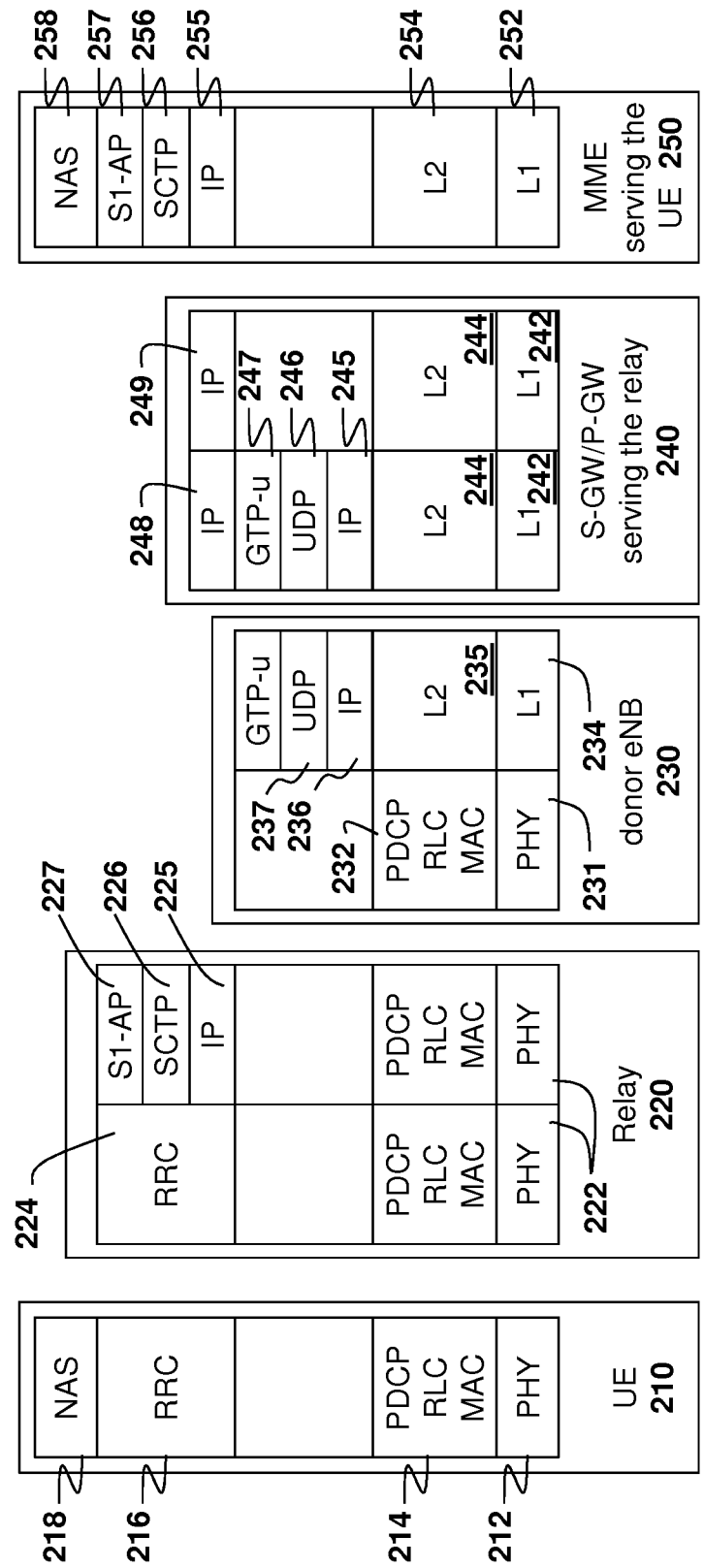
FIG. 2 is a control plane protocol stack for the alternative 1 architecture.

References now made to FIG. 2, which shows the C-plane for the alternative 1.

As seen in FIG. 2, a UE 210 includes various layers, including physical layer 212, PDCP, radio link control (RLC), medium access control (MAC) layer 214, radio resource control (RRC) layer 216 and non-access stratum (NAS) layer 218.

Relay 220 includes a split architecture with the left side being a eNB architecture and the right side being a UE architecture. In particular, relay 220 includes a physical layer 222 for both sides. Further, on the left side of the control plane an RRC layer 224 is provided. On the right side of the control plane an internet protocol (IP) layer 225, Stream Control Transmission Protocol (SCTP) layer 226 and an S1 Application Protocol (S1-AP) layer 227 are provided.

The relay communicates with a Donor eNB 230 which includes a split in the control layers, with the left side towards the relay, and the right side towards the relay's S-GW/P-GW. The left side includes a physical layer 231, a PDCP/RLC/MAC layer 232. The right side has L1 layer 234, L2 layer 235, IP layer 236, user datagram protocol (UDP) layer 237 and a GTP-u layer 238.

The S-GW/P-GW serving the relay layer 240 includes various layers including layer 1 242, layer 2 244, IP layers 245, UDP layer 246, GTP-U layer 247 and IP layers including the relay IP address point of presence, shown by layer 249.

Similarly, MME serving the UE 250 includes layer 1 252, layer 2 254, IP layer 255, SCTP layer 256, S1-AP layer 257, and NAS layer 258.

Figure 3:
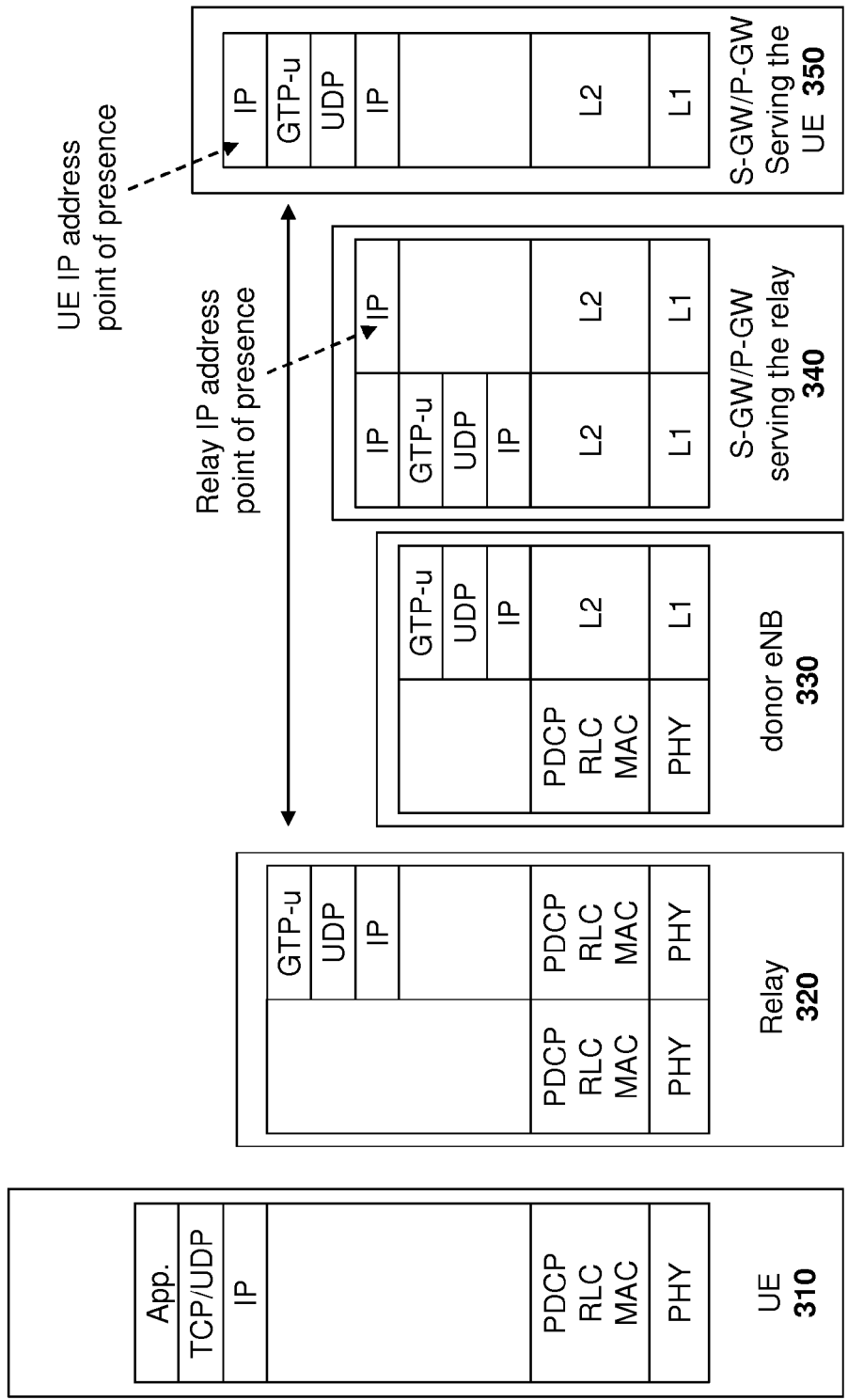
FIG. 3 is the user plane protocol stack for the alternative 1 architecture.

Reference is now made to FIG. 3 which shows the user plane for the first alternative. Similar to the control plane, the UE 310 communicates with relay 320, Donor eNB 330, S-GW/P-GW serving the relay 340, and S-GW/P-GW serving the UE 350. Each of the layers in the control plane corresponds with its peer layer in the next end element.

Alt 2-Proxy S1/X2

In the second alternative, the U-plane of the S1 interface is terminated at the RN and the DeNB. The S-GW serving the UE maps the incoming IP packets to the GTP tunnels corresponding to the EPS bearer of the UE and sends the tunneling packets to the IP address of the DeNB. Upon the DeNB receiving the tunneling packets from the S-GW, the received packets are de-tunneled and the user IP packets are mapped to another GTP tunnel and sent to the IP address of the RN.

EPS bearers of different UEs connected to the RN with similar QoS are mapped in one radio bearer over the Un interface.

Figure 4:
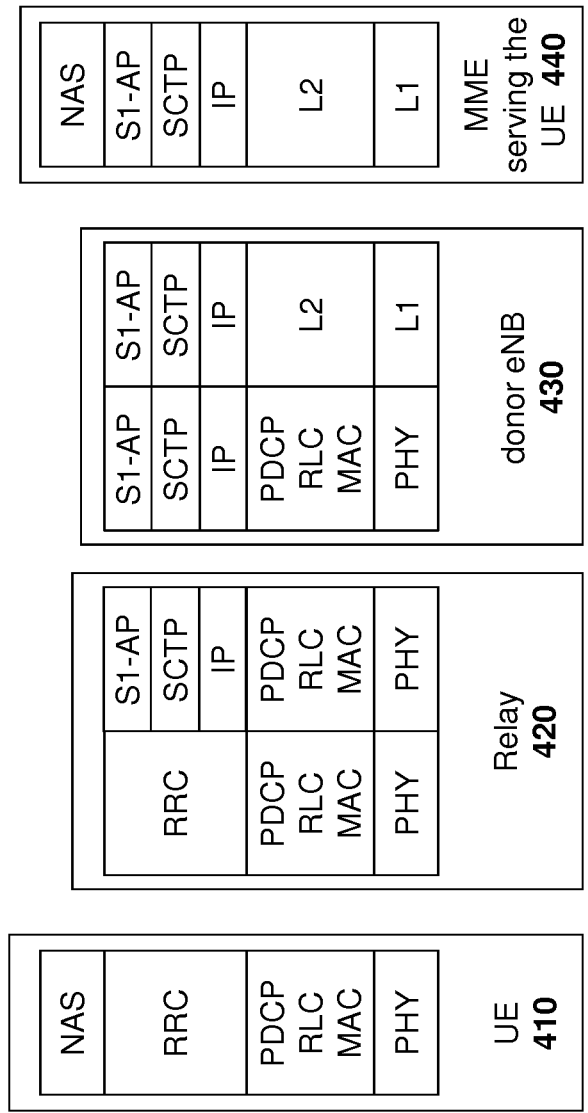
FIG. 4 is a control plane protocol stack for the second alternative architecture.

Reference is now made to FIG. 4, which shows the control plane for the second alternative. In particular, UE 410 communicates with relay 420 which communicates with Donor eNB 430 and MME 440. As seen in a comparison between FIG. 2 and FIG. 4, the embodiment of FIG. 4 does not include the S-GW/P-GW serving the relay since this functionality is now part of the Donor eNB.

Further, various layers correspond between the various elements in FIG. 4.

Figure 5:
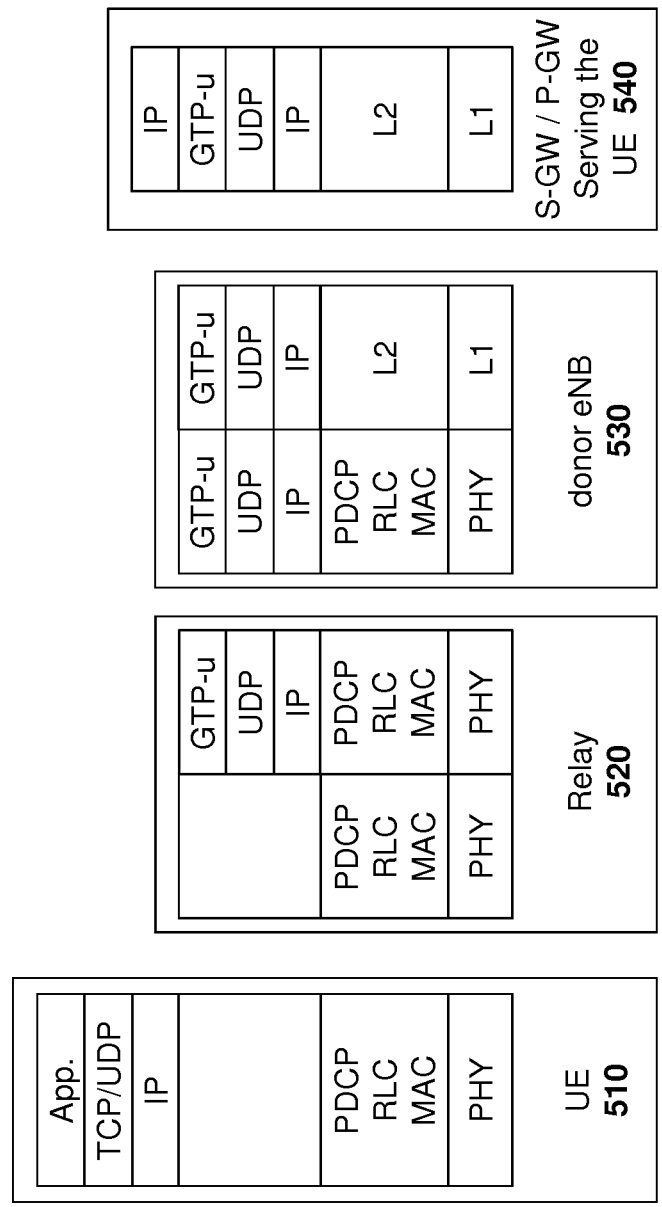
FIG. 5 is the user plane protocol stack for the second alternative architecture.

Referring to FIG. 5, the user plane similarly shows that functionality previously found in FIG. 3 has now been assumed by the Donor eNB. In particular, UE 510 communicates with relay 520 which communicates with Donor eNB 530 and the serving gateway (S-GW) 540.

Alt 3-RN Bearers Terminate in DeNB

In the third alternative, the baseline solution of Alt 1 is enhanced by integrating the S-GW/P-GW functionality for the RN into the DeNB. Thereby, the routing path optimized as packets do not have to travel through a second P-GW/S-GW, but otherwise the same functionality and packet handling as applied above with regard to alternative 1 is provided.

Figure 6:
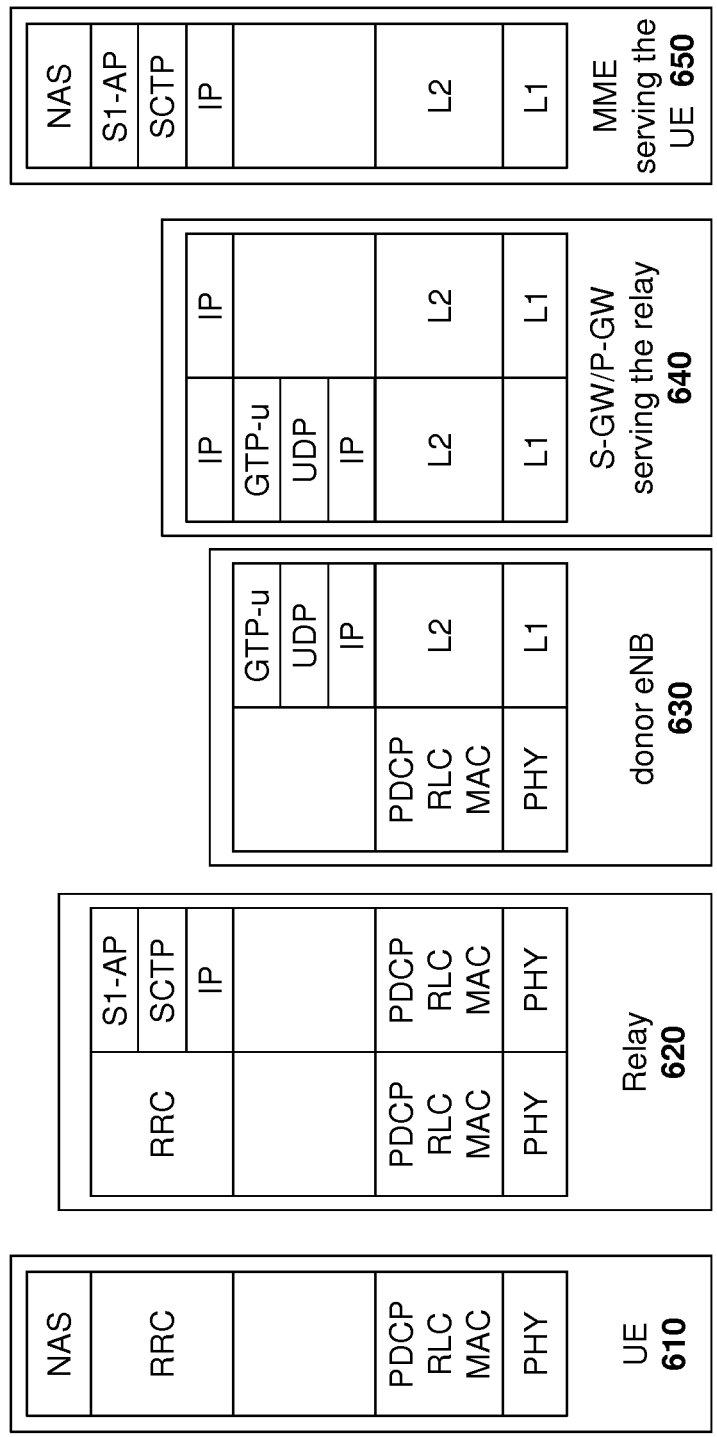
FIG. 6 is a control plane protocol stack for the third alternative architecture.

Referring to FIG. 6, the C-plane architecture includes the UE 610, relay 620, Donor eNB 630, S-GW/P-GW serving the relay 640 and MME serving the UE 650. In the alternative 3 shown in FIG. 6, the S-GW/P-GW 640 is integrated into DeNB 630.

Figure 7:
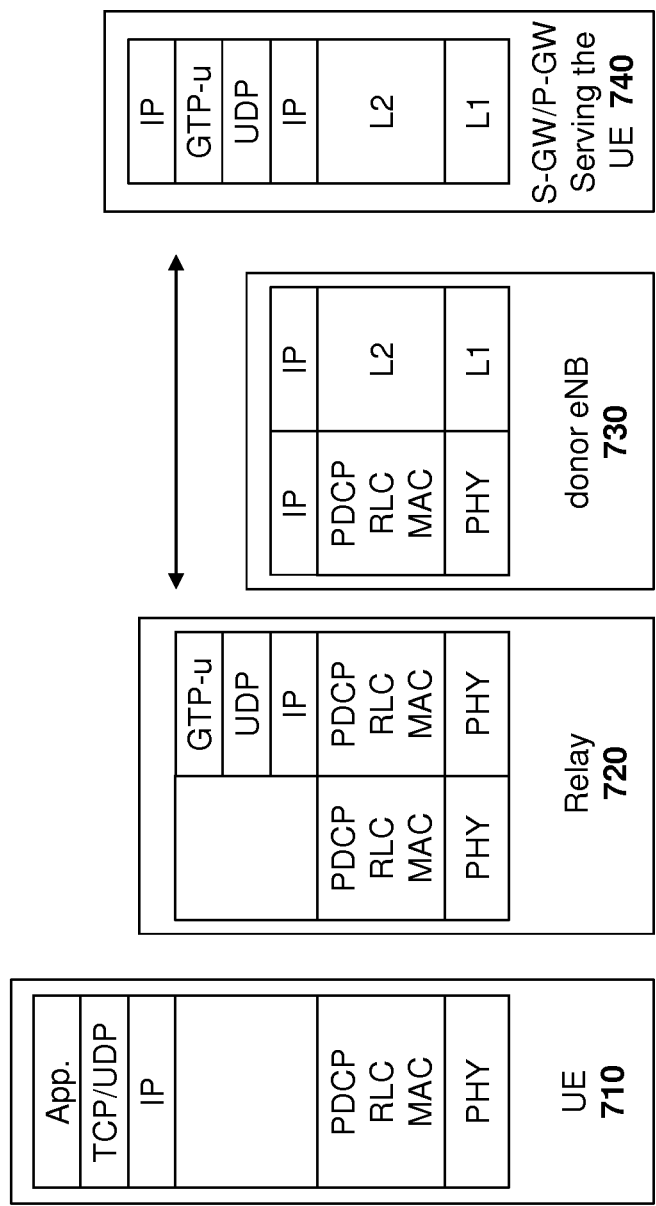
FIG. 7 is the user plane protocol stack for the third alternative architecture.

Further, in this architecture, referring to FIG. 7, the U-plane of the S1 interface is terminated at the RN. The S-GW serving the UE maps the incoming IP packets to the GTP tunnels corresponding to the EPS bearer of the UE and sends the tunneled packets to the IP address of the RN. The DeNB is simply acting as an IP router in the example of architecture 3 and forwards the GTP-U/UDP/IP packets between two interfaces. The DeNB performs this router functionality via the P-GW like functionality in the DeNB.

Referring to FIG. 7, UE 710 communicates with relay 720 which communicates with Donor eNB 730 which communicates with S-GW/P-GW 740. Thus, the relay 720 may communicate directly with S-GW/P-GW 740 in the embodiment of FIG. 7.

The DeNB also performs other P-GW like functionality for the UE side of the relay such as the management of QoS. EPS bearers of different UEs connected to the RN with similar QoS are mapped in one radio bearer over the UN interface.

Alt 4-S1 UP Termination in DeNB

As indicated above, a second architecture, labeled as architecture B has a fourth alternative which is the S1 user plane (UP) is terminated at the DeNB. The S-GW serving the UE maps the incoming IP packets to the GTP tunnels corresponding to the EPS bearer of the UE and sends the tunnelled packets to the IP address of the DeNB. Upon the DeNB receiving the tunneled packets from S-GW, the received packets are de-tunnelled and the inner user IP packets are mapped to the Un radio bearers corresponding to the EPS bearer of the UE. Each EPS bearer of the UE connected to the RN is mapped to separate radio bearers over the Un interface.

Figure 8:
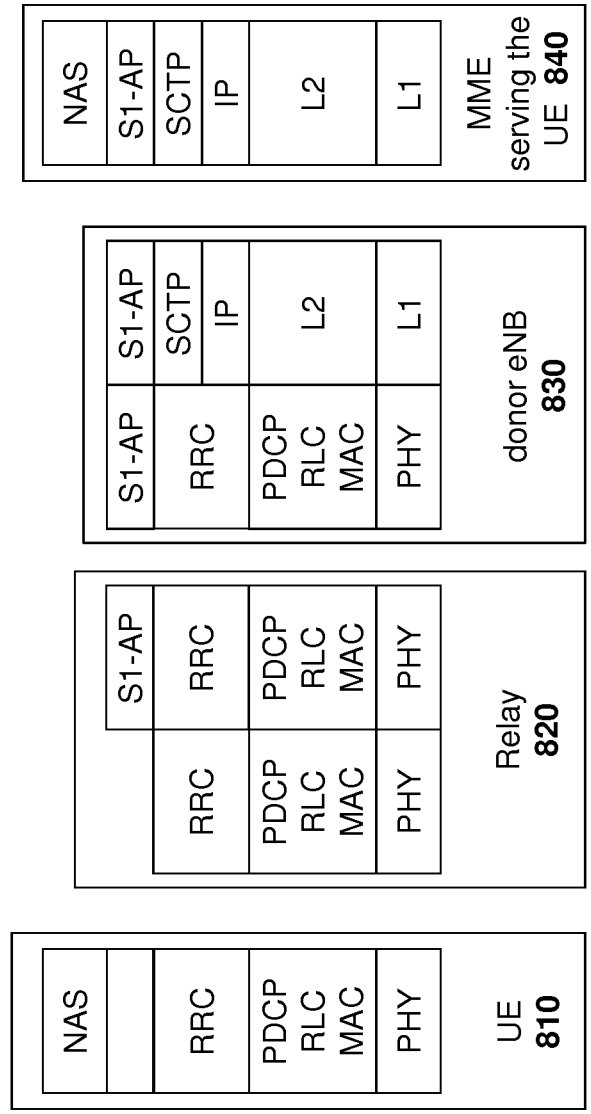
FIG. 8 is a control plane protocol stack for the fourth alternative architecture.

Specifically referring to FIG. 8, FIG. 8 shows the control plane for the fourth alternative in which UE 810 communicates with relay 820, Donor eNB 830, and MME serving the UE 840.

Figure 9:
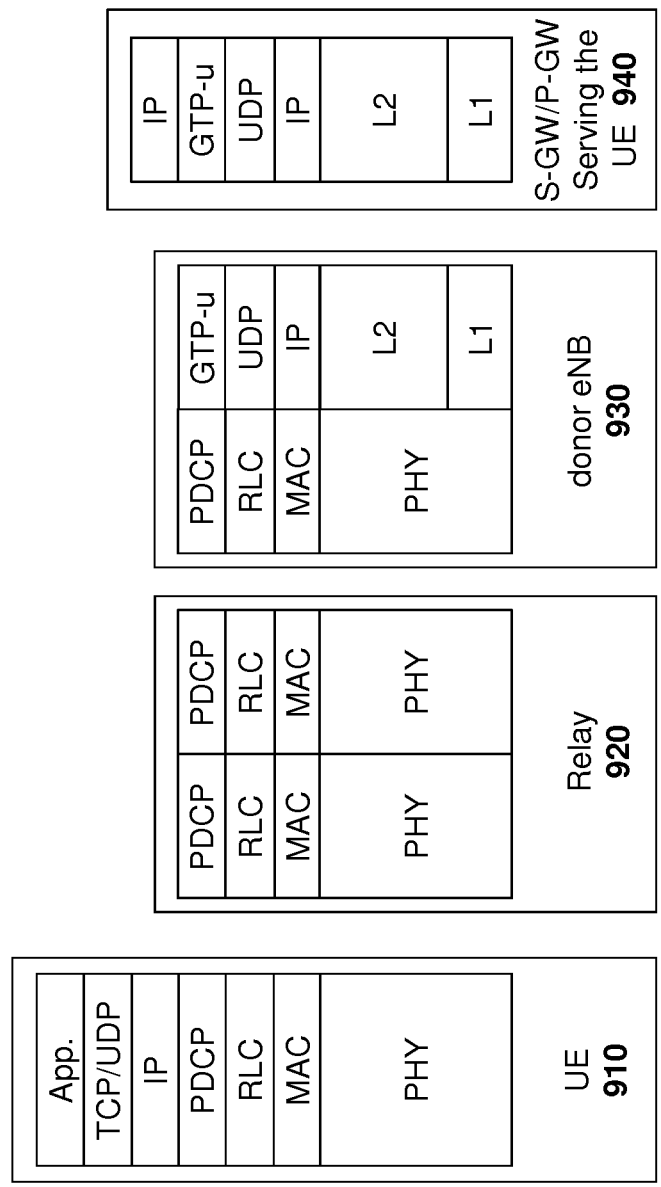
FIG. 9 is the user plane protocol stack for the fourth alternative architecture.

Similarly in FIG. 9, the user plane is shown for UE 910, relay 920, Donor eNB 930 and S-GW/P-GW serving the UE 940.

With regard to the above four alternatives, the assumption is that the RN is stationary. Hence the above described architectures are designed based on stationary relays and do not directly apply to a scenario having a moving RN. However, when the RN is mobile, not only does the RN need to be handed over to another cell, but also the UEs connected to the RN cell will also be impacted. For a moving RN, the embodiments described herein enable mobile relays to be handed to other cells and minimize QoS impact to UEs actively connected to the RN.

For example, one embodiment that utilizes a mobile relay would be in a fast moving vehicle. The mobile relay is deployed to improve the quality of service for UEs on that vehicle. In order to achieve the improved quality of service, mobile relay handover reliability should be high and handover latency should be reduced as much as possible. Otherwise, all UEs connected to the mobile relay would lose network connections as a result of RN handover failure.

In the embodiments described below, the second alternative architecture is generally used as an example. However, the other alternatives are also considered for purpose of supporting mobile relays. Possible enhancements to improve a RN handover reliability and latency are also provided below.

RN Mobility-Alternative 2

X2-based RN mobility procedures.

From the above alternatives, alternative 2 is provided as an example of a relay architecture for LTE-A. In this architecture, the user plane (U-plane), and the control plane (C-plane) of the S1 connections both terminate at the RN. The designated eNB serves as a proxy for the RN cell with the relay gateway functionality. The designated eNB proxy switches the general packet radio service (GPRS) tunneling protocol (GTP) tunnels spanning from the S-GW/P-GW of the UE to the DeNB to another GTP tunnel going from the DeNB to the RN. There is a one to one mapping between the two GTP tunnels.

On the control plane, with the DeNB proxy functionality, the S1-AP messages sent between the MME and the DeNB are translated into S1-AP messages between the DeNB and the RN by modifying the S1-AP UE IDs in the message and leaving other parts of the message unchanged.

In one embodiment, the DeNB S1-AP proxy operation is transparent for the MME and the RN. In other words, from the MME's perspective, only the DeNB is seen and the UE connects to the DeNB directly. From the RN's perspective, it is not aware of the DeNB proxy operation and thus the communications are as if the RN talks to the MME directly. Therefore, when the RN moves from one DeNB to another DeNB, the MME which serves UEs under the RN cell would need to switch the UEs GTP tunnel end point to the target eNB. In addition, the RN cell UE contexts may need to be forwarded from the source eNB to the target eNB so that the target DeNB could operate as the proxy S1/X2 for UEs handed over along with the RN.

From a UE's perspective, the UE is not aware of the RN handover as it is connected to the same serving cell (i.e., RN) during the process. It is the source DeNB's responsibility to inform the target DeNB about the RN cell UE contexts and also initiate group mobility procedures on behalf of the RN cell UEs. It is also possible that the RN informs the target DeNB about RN cell UE contexts.

For RN mobility procedure, the process for RN mobility and the associated UE mobility can be characterized by 3 steps. In a first step, the RN is handed over from the source DeNB to the target DeNB. In a second step, the S1/X2 interface is established between the RN and the target DeNB. In a third step, the UEs under the RN cell are handed over as a result of RN mobility.

In one embodiment, the second and third steps above may be handled in parallel as an optimization to minimize UE handover latency. Further, although detailed operation of each step among different architectures varies, the general 3 step procedure typically applies to any relay architecture.

Figure 10:
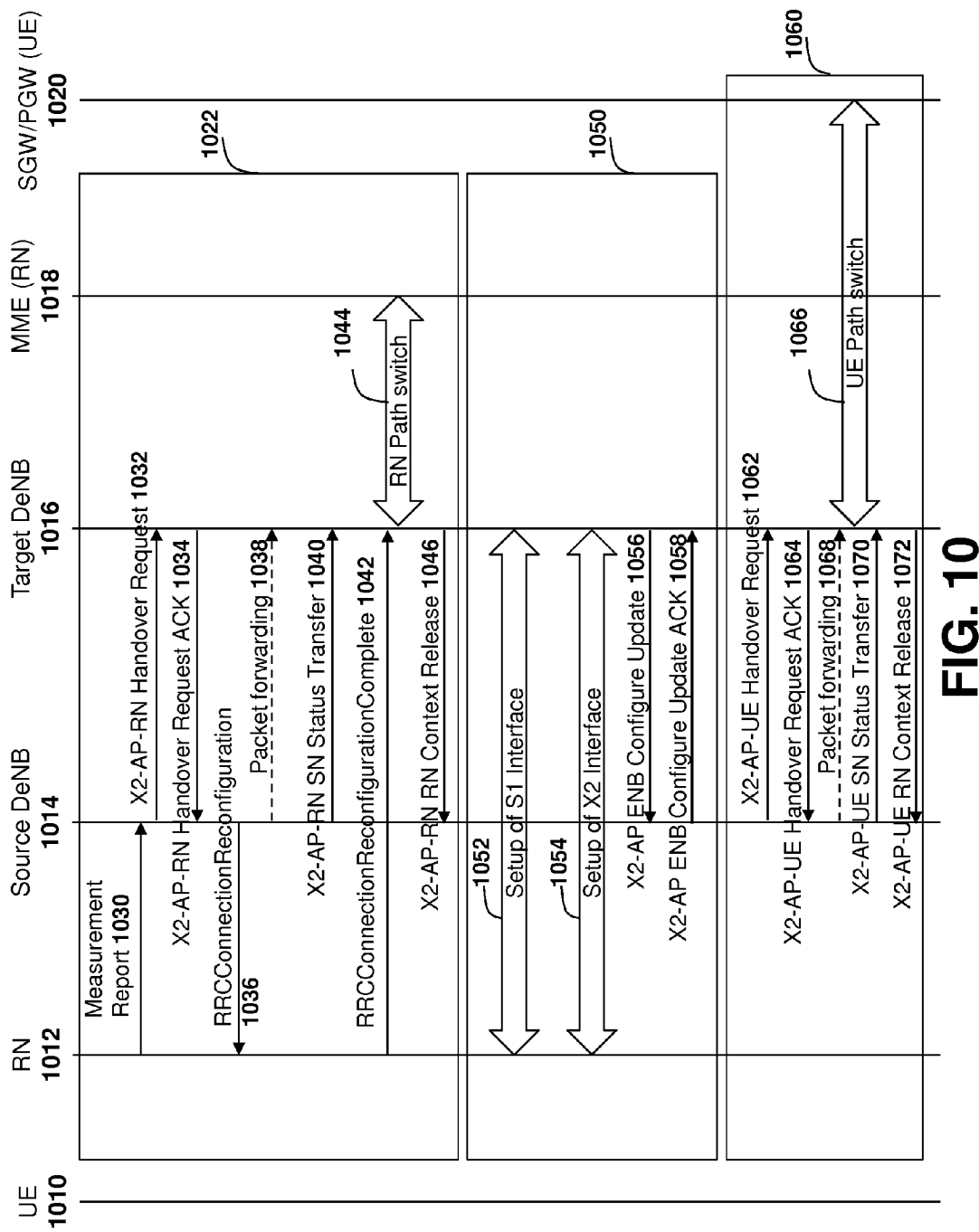
FIG. 10 is a flow diagram showing X2 message exchange for mobile RN handover in the second alternative architecture.

Reference is now made to FIG. 10. In FIG. 10 UE 1010 communicates with RN 1012. Further, DeNB 1014 is the source DeNB for RN 1012. DeNB 1016 is the target DeNB for RN 1012 during mobility. MME 1018 is the MME responsible for RN 1012. Further, S-GW/P-GW 1020 for UE 1010 may communicate with the various DeNBs.

In the embodiment of FIG. 10, the RN is moving towards a cell edge of source DeNB 1014 and needs to be transitioned to target DeNB 1016. Thus, in accordance with the first step described above, the RN is handed over from the source DeNB to the target DeNB. This is illustrated by box 1022.

As a first step of the RN mobility process, the RN is handed over from the source DeNB to the target DeNB by acting as a UE. Success of RN handover as a UE from one DeNB to another DeNB is needed in order to continue to serve the UEs under the RN cell. Since the RN acts as a UE, the LTE handover procedures may be utilized. In particular, the RN 1012 sends a measurement report 1030 to source DeNB 1014. The source DeNB makes a handover decision based on the measurement report 1030 and selects a target cell.

The source DeNB 1014 then sends a handover request message to the target DeNB 1016 over an X2 interface, is shown by arrow 1032.

The target DeNB 1016 receives the message and responds with a handover request acknowledgement message over the X2 interface, as shown by arrow 1034.

The source DeNB 1014 receives the acknowledgement message and send a handover command message to RN 1012, shown by RRCConnectionReconfiguration message 1036. If there is any RN bearer packets not sent at the source DeNB, those packets can be forwarded to the target DeNB as shown by arrow 1038.

Source DeNB 1014 also provides a sequence number (SN) status transfer over the X2 interface, as shown by arrow 1040.

The RN 1012 receives the handover command message, attaches to the target DeNB and completes its handover process. This is shown by the RRCConnectionReconfigurationComplete message shown at arrow 1042.

After the completion of the RN handover, the MME 1018 which serves the RN switches the GTP tunnel endpoint corresponding to the RN bearers to the target DeNB, as shown by arrow 1044.

Upon the RN path switch, target DeNB 1016 then sends an RN Context Release message to source DeNB 1014, as shown by arrow 1046.

Although the step 1 procedures is shown by box 1022 are generally the same as the procedure for UE handover in LTE, modification to information elements of the HANDOVER REQUEST and HANDOVER REQUEST ACKNOWLEDGEMENT messages 1032 and 1034 respectively are made in one embodiment to indicate that handover is for a relay node and to characterize the RN radio bearer or the UE under the RN cell bearer information.

For example, LTE released 10 handover request messages contain UE context information, including a list of UE bearers and associated quality of service parameters.

If the same information elements are used for RN handover request messages, then the information elements may contain the RN context information including the list of RN bearers and associated QoS parameters.

However, using an existing HANDOVER REQUEST message may not be appropriate for an RN for the following reasons. First, in current handover request messages there is no information element indicating if the request is from a UE or an RN. However, under the second alternative architecture, if the target eNB does not have proxy functionality it should not accept a handover request since it will be unable to accommodate the proxy functionality for the RN.

Presently a target DeNB's proxy capability may not be known to the source eNB through X2-AP messaging. Thus, in one embodiment an indication may be provided in a HANDOVER REQUEST message to indicate the handover request message is for the RN in order for it to allow the target eNB to make a proper handover decision.

Secondly, since the DeNB serves as a proxy node for the RN, there is no RN bearer in the architecture carrying a UE's traffic. Only the RN radio bearer from the DeNB to the RN carries the UE data. The target eNB would not be able to evaluate if it has sufficient radio resources to serve the RN based on a current handover request message, for example.

In order to address the above issues, various options are possible. First, to select an eligible target DeNB having the capability to support the RN, various solutions are possible. In a first solution, an additional information element may be added to a handover request message as a relay node indicator such that the target eNB can differentiate handover requests for UEs and handover requests for RNs, and respond accordingly. Such an information element could, for example, be as small as one bit to flag to indicate whether the request is for a UE or an RN. Multi-bits flag are also possible to indicate additional information.

A second option to select eligible target DeNBs with RN support capabilities is to exchange RN proxy capabilities among neighboring eNBs so that neighboring eNBs are aware in advance of the capabilities of the neighbors. In this way, the HANDOVER REQUEST message does not need to indicate a node type since the source DeNB only sends the handover request message to eNBs that have RN proxy capabilities. The exchange of information may occur, in some embodiments, utilizing signaling over the X2 interface.

In a third option, the RN itself could perform neighbor cell measurements, similar to UEs that utilize the LTE 3GPP standards. Thus, the RN may limit it's measurements to only certain cells which have the proxy X2/S1 functionality to support a type 1 relay. For example, neighboring eNBs may exchange their capability to support X2/S1 proxy functionality by X2 signaling. The eNBs may indicate the proxy capability of neighbor cells by including the eNB capability in their RN specific information. This information may be included in messages, such as the RN Reconfiguration message, as defined by the 3GPP standards.

The RN may read the RN specific information and limit its neighbor cell measurements to only those cells which support proxy capabilities and report the measurements back to the serving cells. The measurement reports may be included in an RN specific RRC message, for example.

In a fourth option for determining the capabilities of a target eNB, the enhanced universal terrestrial radio access network (E-UTRAN) provides measurement configurations applicable for the RN through dedicated signaling. For example, the E-UTRAN may utilize the RRCConnection-Reconfiguration message. Similar to regular UEs, the measurement procedures distinguish between various types of cells. These include the serving cell, listed cells and detected cells. The DeNB can use the "CellsToRemoveList", the "CellsToAddModList" fields in the "MeasObjectEUTRA" to direct the RN to perform measurement toward potential target DeNBs that have the capability to serve the RN. The MME of the RN could provide a list of potential target DeNBs that the RN can move to.

In a fifth option for determining the capabilities of target eNBs, the RN may signal its requirement for a proxy enabled target eNB. For example, the RRCConnectionReconfigurationComplete message sent from the RN to the target DeNB may include an indication that the message was sent from an RN as opposed to a UE. If the target DeNB does not have proxy functionality, the target DeNB could release the RRC connection with the RN or direct the RN to another cell.

In a sixth option for discovering the capabilities of the target DeNB, the RN context within the source eNB contains information regarding roaming restrictions that were provided either at connection establishment or at the last tracking area update. The RN can perform a tracking area update (TAU) with the MME, and the MME could inform the DeNB of a list of eNBs that have RN proxy capability. Accordingly, the DeNB could perform a handover request to eligible eNBs that can support RN functionality. The tracking area update can be performed regularly, for example using a timer, or may be triggered by an event such as a handover, for example.

A second consideration for the steps in a box 1022 is the issue of whether target eNB has enough resources to serve the RN based on a HANDOVER REQUEST message. In one embodiment, therefore, the RN may provide the RN/UE bearer information in a HANDOVER REQUEST message for a target DeNB to allow the target DeNB to make proper handover decisions. Various options are possible for providing such information.

In a first option, the normal Evolved Universal Terrestrial Radio Access Network (E-UTRAN) Radio Access Bearer (E-RAB) information may be replaced with radio bearer information in the handover request message if a RN is being handed over. If the handover request is for an RN, the "E-RABs To Be Setup List" information element (IE) associated with the RN includes the RN radio bearer ID (instead of "E-RAB ID") and quality of service parameters of the RN radio bearers (instead of "E-RAB Level QoS Parameters"), which is contained in the handover request message. The target eNB can decide whether to accept or reject the RN radio bearer based on the information provided.

Corresponding to the modifications made to the handover request message, in the HANDOVER REQUEST ACKNOWLEDGEMENT message, the admitted and/or not admitted RN radio bearer list is provided under "E-RABs Admitted List" and "E-RABs Not Admitted List". If the admission control of the target DeNB accepts the RN, a dedicated random access channel (RACH) preamble may be provided so that the RN can perform non-contention-based random access towards the target DeNB.

In a second option for providing information, per UE bearer information can also be included in the RN handover request message instead of the RN bearer information. As the source DeNB is the proxy node and has access to all the UE bearers, the UE context information can be included instead. That is, a per UE radio access bearer to be set up list, including the E-RAB ID, E-RAB level QoS parameters, uplink GTP tunnel point, among other information, may be included in the handover request message. Based on the per UE bearer information, the target DeNB could accept or reject the handover request.

Correspondingly, the admitted and/or not admitted per UE E-RAB list could be provided in the handover request acknowledgement message. If the admission control of the target DeNB accepts the RN, a dedicated RACH preamble may be provided so that the RN can perform non-contention-based random access toward the target DeNB. The handover request acknowledgement message may also include the uplink and downlink GTP tunnel information for the admitted E-RABs.

Referring again to FIG. 10, a second step shown by box 1050, establishes the S1/X2 between the RN and target DeNB.

After the RN attaches to the target DeNB, the RN establishes the S1/X2 interface with target DeNB 1016. The previous S1/X2 connection with source DeNB 1014 is then terminated. Such establishment may require that existing S1/X2 connections of these target DeNB 1016 need to be updated. For example, the S1/X2 interface may need to register the new cell of the RN toward neighbor eNBs of the DeNB or to register new tracking area codes (TAC) corresponding to the RNs cell toward the MME 1018. The existing eNB configuration update procedures on the S1/X2 interfaces may be used for this purpose in one embodiment.

Target DeNB 1016 may initiate an "eNB Configuration Update" procedure to the UE's MME and also to neighboring eNBs. After the S1/X2 connectivity with the target DeNBs established, the RN is ready to operate as a network node and continues serving the UEs under its cell. Thus, in FIG. 10, as shown by arrow 1052, the setup of the S1 interface is performed.

Further, as shown by arrow 1054, the setup of the X2 interface is performed between RN 1012 and target DeNB 1016.

Further, target eNB 1016 sends an eNB configuration update message to source DeNB 1014, as shown by arrow 1056 and source DeNB 1014 sends an acknowledgement back to target DeNB 1016, as shown by arrow 1058.

In one embodiment, no modifications to existing S1/X2 messages are made during the steps at box 1050.

The third step for handover of an RN is to handover the UEs under the RN control. This step is shown with regard to box 1060 in the embodiment of FIG. 10. Although the UEs are connected with to same serving cell and are not involved in handover process in the second alternative architecture, from the MME's perspective, the UE serving cell is changed from the source DeNB 1014 to the target DeNB 1016. Further, the UE contexts need to be transferred from source DeNB 1014 to target DeNB 1016 for target DeNB 1016 to operate as a proxy for the RN cell UEs.

Thus, in box 1060, the source DeNB 1014 sends a handover request message on behalf of the UEs to target DeNB 1016. This is shown by arrow 1062. The sending of the handover request is done even though the UEs have not initiated any handover request. Existing handover request messages can be used by handling each UE handover request individually.

Similarly, a path switch message can be handled on a per individual UE basis. Such messages are generally sent over a backhaul link.

Existing handover procedures have handover requests that are generally initiated after the eNB has received a measurement report from a UE. However, with a RN, the handover message for the UE is sent from source DeNB 1014 to target DeNB 1016 without receiving any measurement report from the UE to initiate the UE handover process. The source DeNB can access the UE bearer and is able to initiate UE handover processes after receiving the measurement report from the RN.

Further, in existing handover procedures, after receiving a handover command message, the UE will access the target cell using a random access channel (RACH) procedure. However, in the embodiment of FIG. 10, the UE is not involved in the handover process over the Uu interface, and the target cell will not receive any RRCConnectionReconfigurationComplete message from the UE. Thus, differing from the existing UE handover procedures, the target DeNB 1016 will request path switch without receiving the RRC-ConnectionReconfigurationComplete message from the UE.

Referring again to FIG. 10, as a result of receiving the handover request message from source DeNB 1014, target DeNB 1016 sends a handover request acknowledgement message, shown by arrow 1064.

Further, the target DeNB 1016 then initiates the UE path switch with the S-GW/P-GW 1020, as shown by arrow 1066.

The source DeNB 1014 forwards packets to target DeNB 1016, as shown by arrow 1068.

Once the path switch has occurred, source DeNB 1014 sends a SN status transfer message, as shown by arrow 1070, to target DeNB 1016. Target DeNB 1016 then sends a UE context release message, as shown by arrow 1072, to the source DeNB 1014.

In accordance with the embodiment of FIG. 10, no handover command messages are sent from the RN to the UE. The UE mobility procedure is transparent to the UEs under the second architecture RN cell.

Overall, the steps show by box 1060 enable UE mobility as a result of RN handover. After the completion of the messages in block 1060, RN handover and UE mobility procedures are completed.

Further, the messages of box 1060 may be handled in parallel with those of box 1050.

Further, if UE context information is included in message 1032, the UE handover request and handover request acknowledgement messages may be omitted from the steps of box 1060. Further, UE context transfer can start after the source DeNB 1014 has received the handover request acknowledgement message 1034. Thus, the messages of box 1060 can be merged with those of box 1022 if per UE bearer information is included in the RN handover request message. This simplifies the RN mobility procedure and reduces the handover latency for UEs. Otherwise, the messages of bock 1060 are processed after RN handover is completed and separate handover request messages are needed for each UE.

In another possible alternative, at the end of the messages of box 1022, the handover complete message sent from the RN to the target DeNB could include all UE contexts to send to the target DeNB. The target DeNB 1016 may request a path switch for all the UEs that were provided in the message.

S1-Based RN Mobility Procedure

The procedure described above with regard to FIG. 10 is X2 based, which relies on information exchanged between the source DeNB 1014 and target DeNB 1016 through the X2 interface. However, in E-UTRAN, inter-cell handover may be initiated by the S1 interface when X2 based handover is not available. This may occur, for example, when there is no X2 interface between the source and target eNBs or when the MME needs to be changed.

The S1 based handover procedure relies on the MME to transfer handover messages between the source eNB and the target eNB. Similar procedures to those described above with regard to FIG. 10 may be implemented utilizing an S1 based RN handover.

Figure 11:
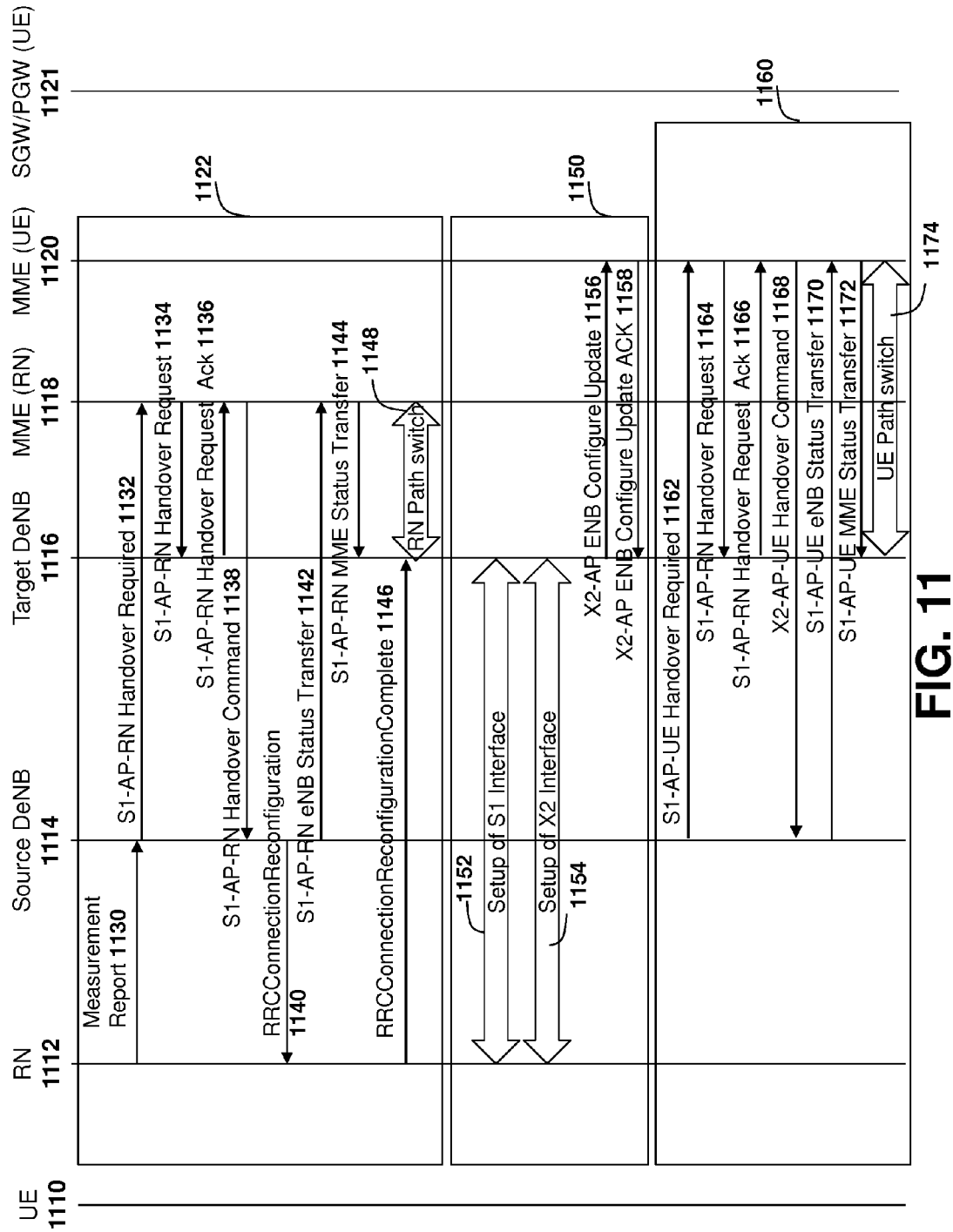
FIG. 11 is a flow diagram showing S1 message exchange for mobile RN handover in the second alternative architecture.
Figure 12:
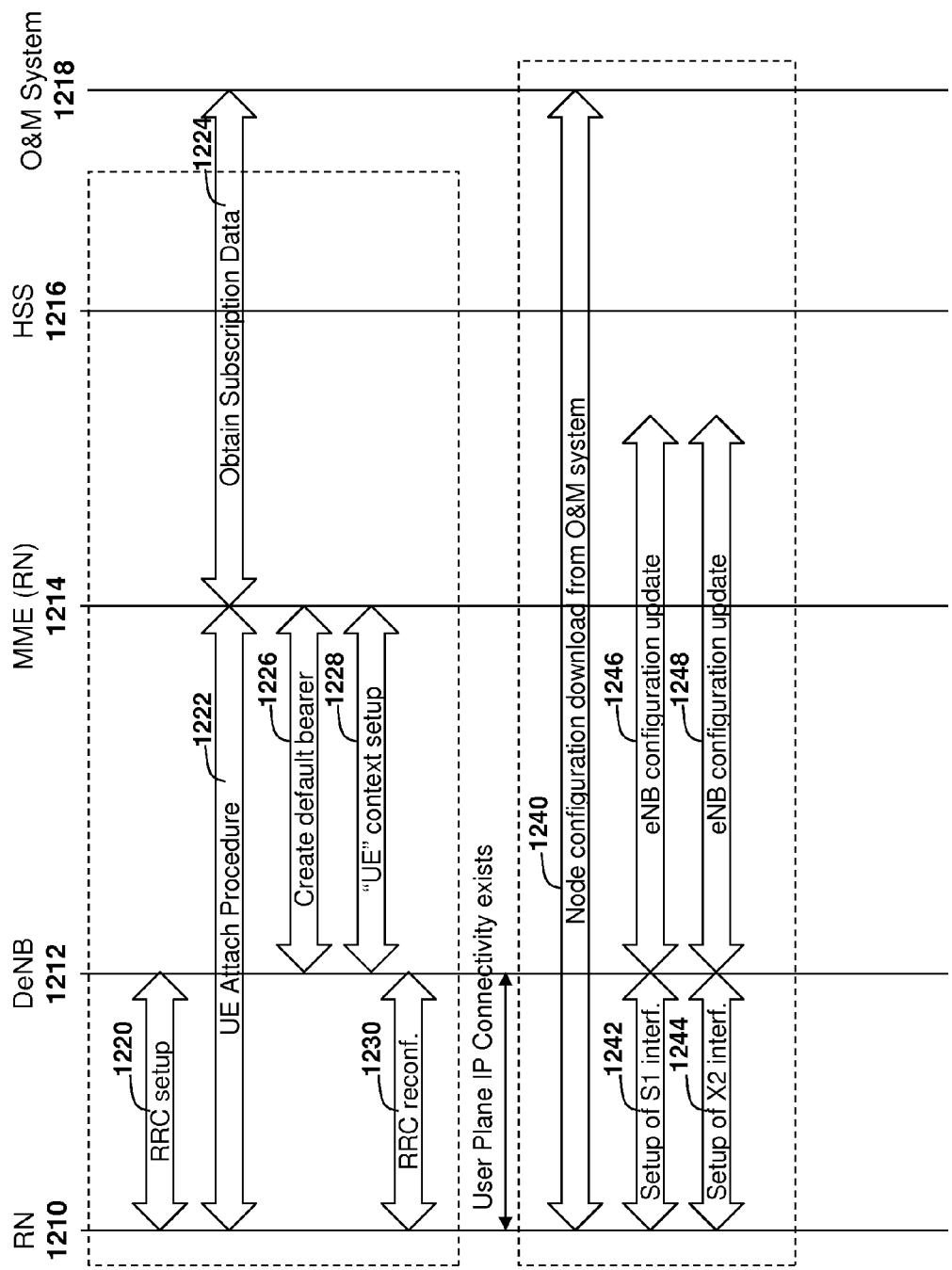
FIG. 12 is a flow diagram showing RN start up procedures in case of handover failure.

Reference is now made to FIG. 11 which shows a UE 1110, RN 1112, source DeNB 1114, target DeNB 1116 MME for the RN 1118 and MME for the UE 1120 and an S-GW/P-GW for the UE 1121. In the embodiment of FIG. 12, the source DeNB 1114 and target DeNB 1116 do not have an X2 interface between them.

The first step of the handover procedure is shown by the box 1122 in FIG. 11. In this case RN 1112 sends a measurement report, shown by arrow 1130, to source DeNB 1114. The source DeNB 1114 then indicates that handover is required in a message 1132 between the source DeNB 1114 and the MME 1118.

The MME 1118 then sends a handover request, shown by arrow 1134 to target DeNB 1116 and target DeNB 1116 then sends a handover request acknowledgement, as shown by references numeral 1136. The message at arrow 1136 is sent to MME 1118.

As a result of the receipt of the message at arrow 1136, MME 1118 sends a handover command back to source DeNB 1114, as shown by arrow 1138. The source DeNB 1114 then sends an RRCConnectionReconfiguration message, as shown by arrow 1140, to RN 1112.

Source DeNB 1114 then sends an eNB Status Transfer message to MME 1118, as shown by arrow 1142 and the MME 1118 sends an MME Status Transfer message, as shown by arrow 1144 to target DeNB 1116.

The RN 1112 then sends an RRCConnectionReconfigurationComplete message to the target DeNB 1116, as shown by arrow 1146 and target DeNB 1116 performs an RN path switch, as shown by arrow 1148.

Thus, according to FIG. 11, the Handover Required message 1132 the Handover Command message 1138 and the eNB Status Transfer message 1142 are sent utilizing the S1 interface.

Further, the handover request message 1134, handover request acknowledgement 1136 and MME status transfer 1144 messages are also sent between MME 1118 and target DeNB 1116 using the S1 interface. As indicated above, the RN MME may not know the target eNB's RN support capabilities. An RN indication can be added in the S1 handover request message to indicate to the target eNB about RN handover. The target eNB can accept or reject the handover based on its RN support capability. Alternatively, in the S1 setup message, an RN support indicator can be added to indicate the eNB's RN support capability to the MME. If the RN support indicator is added to the S1 setup message, the RN MME will only send the handover request message to the target DeNB 1116 if that target DeNB has the capability to support the RN.

Existing signaling messages may need to be modified in order to support RN mobility and include the handover request 1134, the handover request acknowledgement 1136 or the RRC connection reconfiguration complete message 1146.

After the RN is handed over from the source DeNB to the target DeNB, similar procedures as described above with regard to the X2 based RN mobility are performed by the RN to establish the S1 and X2 interfaces with the target DeNB. In particular, referring to FIG. 11, box 1150 shows the setup between RN 1112 and target DeNB 1116 of the S1 interface, shown by arrow 1152 and also the setup of the X2 interface between these two entities, as shown by arrow 1154.

Further, the target DeNB sends an eNB configuration update to the UE MME 1120, as shown by arrow 1156 and an eNB configuration update acknowledgement is sent back from MME 1120 to target DeNB 1116, as shown by arrow 1158.

Finally, S1 based UE under the RN cell context transfer is performed in order for the target DeNB 1116 to operate as a proxy for the RN cell UEs. This is shown by the messages in block 1160. In particular, source DeNB 1114 sends a handover required message for the UE over the S1 interface to the MME 1120, as shown by arrow 1162. The MME 1120 then sends a handover request to target DeNB 1116, as shown by arrow 1164. The DeNB 1116 then sends a handover request acknowledgement as shown by arrow 1166 to the MME 1120.

MME 1120 then sends a handover command to source DeNB 1114 over the S1 interface, as shown by arrow 1168 and the source DeNB 1114 then sends an eNB status transfer message over the S1 interface, as shown by arrow 1170.

MME 1120 then sends an MME status transfer over the S1 interface to target DeNB 1116, as shown by arrow 1172. The target DeNB 1116 and MME 1120 then perform a UE path switch, as shown by arrow 1174.

Thus, based on the above, the handover in the second architecture can be performed over either the X2 or the S1 interfaces.

RN Handover Failure Procedure

In both the X2 based RN handover of FIG. 10 in the S1 based RN handover of FIG. 11, there is a chance that the RN may experience handover failure due to a rapid change of radio conditions. Both the source DeNB and the RN keep some context, for example the Cell Radio Network Temporary Identifier (C-RNTI), to enable the return of the RN in the case of handover failure.

When the RN detects radio link failure during the handover process the RN proceeds through a radio link recovery process similar to a UE to attempt to attach to a DeNB. The handover process failure may, for example, result from a RACH procedure toward the target DeNB not being successful within a certain time.

Upon detecting radio link failure, the RN discards any current RN subframe configuration, enabling the RN to perform normal contention-based RACH as part of the re-establishment. Upon successful re-establishment, the RN subframe configuration can be configured again using the RN configuration procedure. If the radio link cannot be recovered within a certain duration, the RN will go into an RRC idle stage and reinitiate its RRC connection to an appropriate DeNB. This is similar to the RN startup procedure shown with regard to FIG. 12.

In particular, referring to FIG. 12 RN 1210 communicates with a donor eNB 1212. Further, MME 1214 is in communication with RN 1210 and with DeNB 1212.

Home Subscriber Server HSS 1216 further communicates with a MME 1214.

Operations & Maintenance (O&M) system 1218 further communicates with RN 1210.

In a first step, RRC setup occurs, as shown by block 1220. This occurs between RN 1210 and donor eNB 1212.

The RN 1210 then performs a UE attach procedures, as shown by arrow 1222 with MME 1214 which then obtains subscription data from HSS 1216, as shown by arrow 1224.

Donor eNB 1212 then creates a default bearer as shown with MME 1214, as shown by arrow 1226 and then UE context setup occurs between DeNB 1212 and MME 1214, as shown by arrow 1228.

RRC reconfiguration then occurs between RN 1210 and DeNB 1212, as shown by arrow 1230.

After this point, user plane IP connectivity exists between RN 1210 and DeNB 1212.

The RN then performs node configuration download from the O&M system 1218, as shown by arrow 1240.

The RN then sets up an S1 interface with DeNB 1212, as shown by arrow 1242 and the X2 interface setup is shown by arrow 1244. For both S1 and X2, the DeNB 1212 performs eNB configuration updates, as shown by arrow 1246 and 1248.

The embodiment of FIG. 12 therefore shows the setup of the RN with the network from an RRC_IDLE state.

RN Mobility Procedure with Alternative 1

Figure 13:
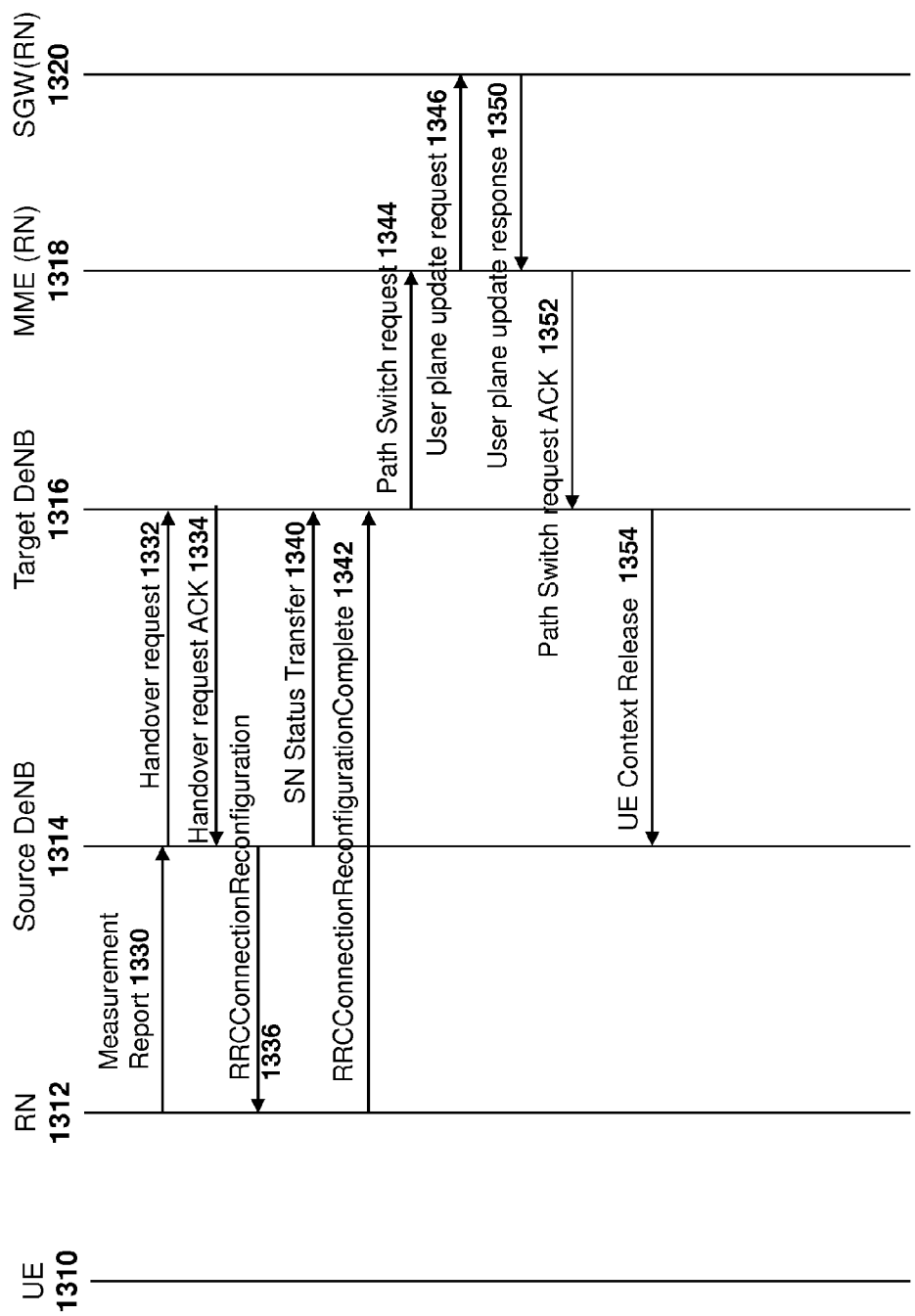
FIG. 13 is a flow diagram showing X2 message exchange for mobile RN handover in the alternative 1 architecture.

Reference is now made to FIG. 13. In FIG. 13 UE 1310 communicates with a relay 1312, which communicates with a source DeNB 1314, target DeNB 1316, the relay MME 1318, and the relay SWG/PWG 1320.

The transfer in accordance with the alternative 1 requires the relay 1312 to send a measurement report message, as shown by arrow 1330 to source DeNB 1314. Source DeNB then makes a handover decision and sends a handover request to target DeNB 1316 as shown by arrow 1332. The target DeNB 1316 sends a handover request acknowledgement back source DeNB 1314, as shown by arrow 1334.

As a result of the acknowledgement, source DeNB 1314 sends an RRC connection reconfiguration message to RN 1312, as shown by arrow 1336.

The source DeNB 1314 then sends an SN status transfer message to target DeNB 1316, as shown by arrow 1340. Relay 1312 sends a RRC connection reconfiguration complete message 1342 to target DeNB 1316, which then performs a path switch request with the relay MME 1318, as shown by arrow 1344.

MME 1318 then sends the user plane update request, shown at arrow 1346, to the relay S-GW/P-GW 1320.

As a result of the message, the user plane update response is sent from relay S-GW/P-GW 1320 to the relay MME 1318, as shown by arrow 1350. A path switch request acknowledgement is then sent from MME 1318 to target DeNB 1316, as shown by arrow 1352 and a UE context release message is then sent to source DeNB 1314, as shown by arrow 1354.

Thus, in the alternative 1, the handover from the source DeNB to the target DeNB is similar to the messages of box 1022 from FIG. 10.

In the alternative 1, the RN-P-GW maps the UE bearer to corresponding RN bearers and encapsulates the RN bearer packets to an outer RN GTP tunnel which ends at the DeNB. Since the RN is transparent to the DeNB, the DeNB cannot access the UE bearer and will not initiate the UE mobility procedure. From a UE-MME point of view, the UE under the RN cell stays in the same serving cell and there is no change of operation due to the RN handover.

The RN P-GW is informed of the RN handover and will route the RN bearer packets to the target DeNB as a result of the RN handover. The S1 interface between the RN and UE MME is not impacted because of the RN handover. The X2 interface between the RN source DeNB should be removed after the RN handover, a new X2 interface between the RN and target DeNB should be established. This may require that the existing S1/X2 connections of the DeNB are updated, for example, to register the new cells of the RN towards to the neighbor eNBs of the DeNB or to register new tracking area codes corresponding to the RN cells towards the MME. Existing eNB configuration update procedures on the S1/X2 interfaces can be used for this purpose.

Thus, in accordance with the embodiment for the first architecture, when the RN changes its DeNB during handover, there is no impact on the Uu radio bearer of the UE as well as the external bearer of the RN between the RN-P-GW and UE-MME. The RN mobility can be supported through the handover procedures for the alternative 1 and no additional elements are added to for the UE mobility. However, supportive RN operation is needed at the target DeNB. Therefore, the RN may need to indicate its node type in the handover request message. If the target DeNB cannot support RN node operation, the target DeNB may reject the RNs handover request. If neighboring eNBs exchange the RN proxy capability in advance, then an indication may not be needed.

While the above is described with regard to X2 communications between the source DeNB and Target DeNB, similar procedures could also be implement utilizing the S1 interface.

RN Mobility Procedure with the Third Alternative Architecture

Figure 14:
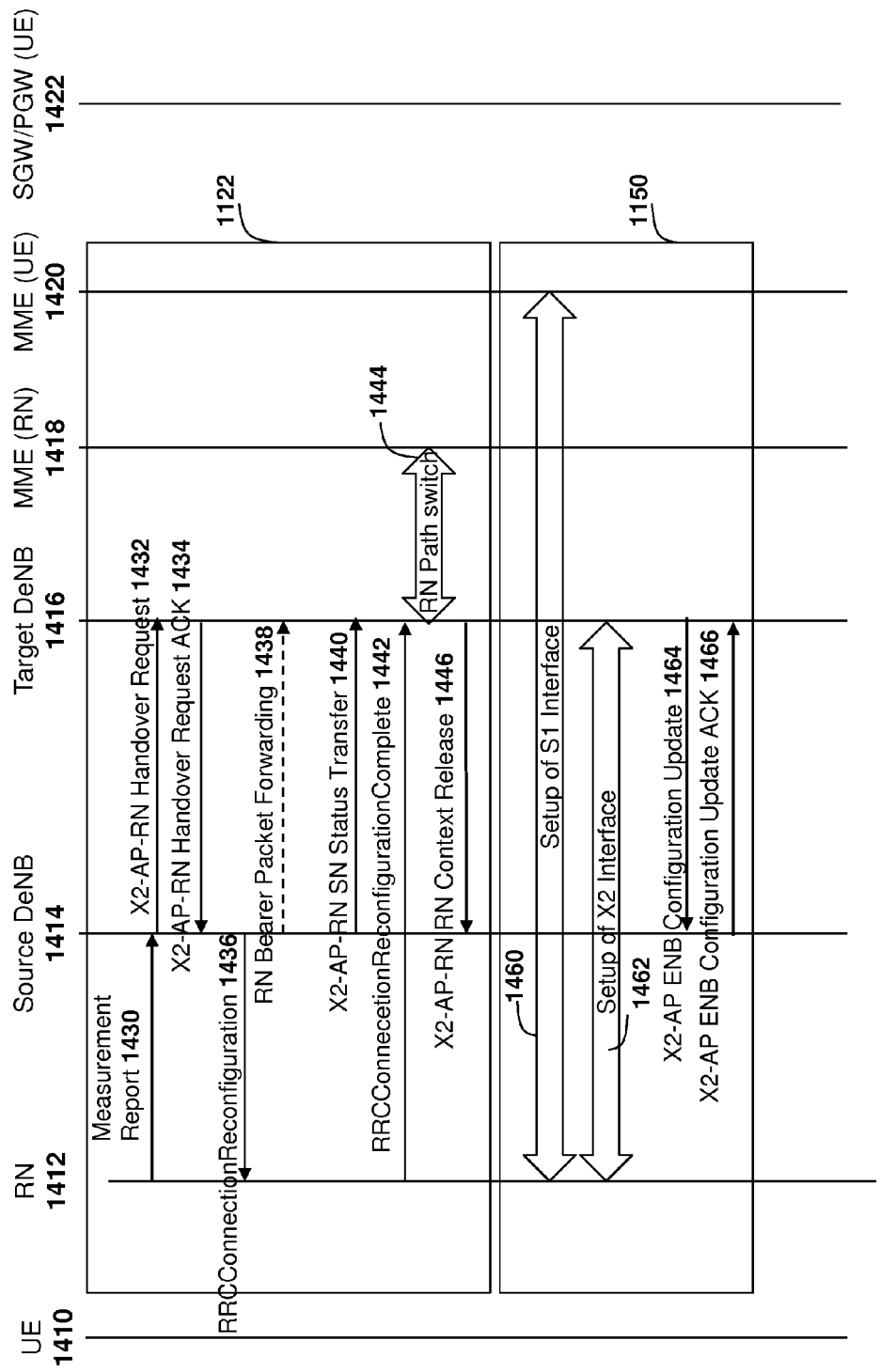
FIG. 14 is a flow diagram showing X2 message exchange for mobile RN handover in the third alternative architecture.

In a third alternative architecture, the RN-P-GW is located at the DeNB to avoid packets routing with the second P-GW/S-GW before arriving at the DeNB. Reference is now made to FIG. 14, which shows UE 1410, RN 1412, source DeNB 1414, target DeNB 1416, MME 1418, MME for the UE 1420 and S-GW/P-GW 1422.

Similar to the alternative 1, the RN mobility process is transparent to the UEs and there are no impacts on the Uu radio bearer of the UE. Existing signaling messages may need to be modified in order to support RN mobility.

In particular, RN 1412 sends a measurement report to source DeNB 1414, as shown by arrow 1430. The source DeNB 1414 then sends a handover request 1432 to target DeNB 1416. This handover request may need to be modified for RN mobility.

Target DeNB 1416 then sends a handover request acknowledgement 1434 which may also may need to be modified based on the RN mobility scenario.

As a result of the acknowledgement, source DeNB 1414 sends an RRC connection reconfiguration message to RN 1412, as shown by arrow 1436.

RN bearer packet forwarding occurs between the source DeNB 1414 and target DeNB 1416, as shown by arrow 1438. Further, an SN status transfer message is also sent between source DeNB 1414 and target DeNB 1416, as shown by arrow 1440.

The RN 1412 then sends an RRC connection reconfiguration complete message, shown by arrow 1442. An RN path switch then occurs for the target DeNB and RN MME 1418, as shown by arrow 1444 and the RN context release is then sent between target DeNB 1416 and source DeNB 1414, as shown by arrow 1446.

In accordance with the embodiment of FIG. 14, the S1 interface is then set up between the RN and the UE MME 1420, shown by arrow 1460 and the X2 interface is set up between RN 1412 and target DeNB 1416, as shown by arrow 1462. Target DeNB then sends an eNB configuration update to source DeNB 1414, as shown by arrow 1464 and the eNB configuration update acknowledgement is sent back to target DeNB, as shown by arrow 1466.

Since the RN-P-GW functionality is located at the target eNB 1416 in order to support the RN, the RN should indicate its node type in the handover request message, similar to the alternative 2 example above. eNBs that do not have RN S-GW/P-GW functionality may reject the handover request correspondingly. Further, if neighboring eNBs exchange RN proxy capability in advance, this indication may not be needed.

When the RN is handed over to the target DeNB, the RN P-GW/S-GW moves from the source DeNB to the target DeNB consequently. From the UE MME point of view, the RN has changed the IP address and the S1 bearer of the UE and should be re-established. To resolve this issue, the RN may re-establish its S1 connection with all UE MMEs so that the UE MMEs will route the UE packets to the target DeNB. The S1 bearer re-establishment with the MMEs may take a long time. However, in certain scenarios such as the mobile relay for a high speed train, this S1 interface may be preconfigured for the RN since the movement and handover may be predetermined. Such optimizations are described below in more detail.

Similarly, the X2 interfaces of RNs may need to be re-established as the RN P-GW/S-GW changes IP addresses. Further, the existing S1/X2 connections of the DeNB may need to be updated. Existing eNB configuration update procedures on the S1 X2 interfaces may be used for this purpose.

After the S1 interfaces are re-established with UE MMEs, the UE packets may be routed to the target DeNB without additional signaling exchanged over the backhaul. Thus, from FIG. 14, the RN mobility procedure only uses the step 1 and step 2 procedures from the second alternative architecture.

The RN mobility procedure in the third alternative is similar to the alternative 1. Modifications may be needed to current procedures to include relay node indications in the handover message. In addition, the RN would need to re-establish the S1/X2 interface to go into normal network operation after being handed over.

RN Mobility Procedures with the Fourth Alternative Architecture

In the fourth alternative architecture, the DeNB acts as a termination for the S1 connection towards the EPC and the RN can simply be seen as a cell managed by the DeNB from the EPC and neighboring eNB's point of view. The DeNB acts as an S1-AP gateway, similar to the Home eNB (HeNB) gateway. Thus, the main difference between the fourth alternative and the second alternative is in the S1 user plane, where the GTP tunnel for the UE bearer ends at the DeNB and node GTP tunnel for the RN/UE bearer exists between the DeNB and RN in the fourth alternative.

The mobility procedure here is the same is that described above with regard to FIG. 10, where the RN is handed over as a UE first and then the handover for UEs under RN cell mobility procedures are triggered.

The modifications to existing procedures for the fourth alternative are that the relay node indication in the Handover Request message is provided. Further, the UE context information may be included in the RN handover message. Otherwise the UE mobility procedure may be triggered as in the block 1060 of FIG. 10.

Further, the target DeNB may request UE path switch after the RN is attached to the target DeNB without receiving a UE RRC connection reconfiguration complete message. No handover command is sent to the UE in the present embodiment.

Further Enhancements for RN Mobility

The above embodiments describe situations in which the RN can be mobile and serve UEs under its cell and an LTE network. In some embodiments, it is possible to reduce the amount of time that such handover takes. The embodiments below describe several enhancements that may be implemented with the above techniques. In all of the embodiments below, aspects from the above embodiments may be used in conjunction with the embodiments below. Further, the embodiments below may be used together in some cases.

Step 1 Enhancements

All of the above embodiments have the handover of the RN from the source DeNB to the target DeNB as a UE. In some embodiments, choosing an appropriate handover parameters, such as smaller handover thresholds and shorter time-to-trigger (TTT) for measurement reports, may aid in triggering handover earlier in a high speed environment and thus reduce the handover failure rate.

In an alternative 1 embodiment, a fast handover command may be utilized. For example, in a relay situation where the relays are part of public transportation such as a high speed train, the high speed scenario poses challenges to RN mobility due to the frequent handovers and fast changing radio conditions. On the other hand, various characteristics of the high speed train scenario can be taken advantage of to improve user experience.

One feature of a high speed train application is that many eNBs are placed on the route of the high speed train for the purpose of serving the train, especially in rural areas that the train passes by. There is little or no traffic for these eNBs before or after the train arrives or leaves the area. When the RN is handing over to these eNBs, the target eNBs are almost always available with full radio resources. Thus, the traditional network controlled UE assisted handover procedures can be optimized in such scenarios. The present disclosure is not however meant to be limited to high speed train scenarios and other similar scenarios for transport can be used, including relays on buses traveling on highway networks, aircraft using specific flight patterns among others.

Figure 15:
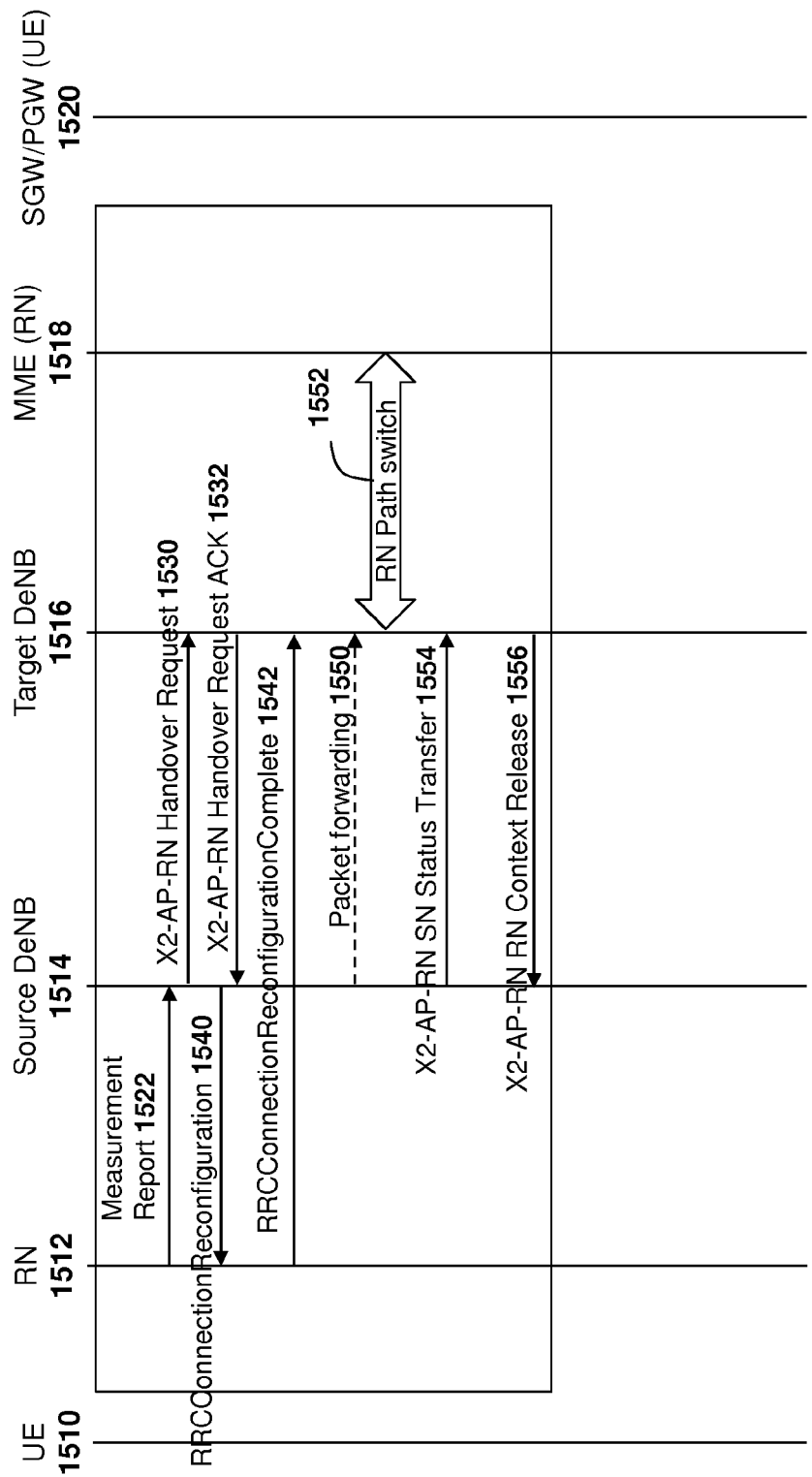
FIG. 15 is a flow diagram showing a fast handover optimization embodiment.

In accordance with one alternative embodiment, one optimization is to have the handover command from the source DeNB to the RN sent before receiving a handover request acknowledgement message from the target DeNB. Reference is now made to FIG. 15. In FIG. 15 UE 1510 communicates with RN 1512. Further communication occurs between various ones of the source DeNB 1514, target DeNB 1516, MME 1518 and SWG/PWG 1520.

As seen in embodiment of FIG. 15, the RN sends a measurement report to source DeNB 1514, as shown by arrow 1522.

As seen in the embodiment of FIG. 15, source DeNB 1514 sends a handover request, shown by arrow 1530, to target DeNB 1516.

Before the handover request acknowledgement message, shown by arrow 1532, is received from target DeNB 1516, source DeNB 1514 then sends the RRC connection reconfiguration message to RN 1512, as shown by arrow 1540. The sending of the message at arrow 1540 prior to the receiving of the handover request acknowledgement 1532 speeds the handover process, and in rapidly changing radio conditions has a higher chance of success to actually trigger the handover at RN 1512.

RN 1512 then sends an RRC connection reconfiguration complete message to target DeNB 1516, as shown by arrow 1542 and the remaining steps of the first step in the transition proceed as previously described. Namely, packet forwarding occurs, as shown at arrow 1550, the RN path switch is performed between target DeNB 1516 and MME 1518, shown by arrow 1552, the SN status transfer message is sent from source DeNB 1514 to target DeNB 1516, shown by arrow 1554, and the target DeNB 1516 sends an RN context release message to source DeNB 1514, shown by arrow 1556.

For the above, to facilitate RN handover, the C-RNTI and one or more dedicated RACH preambles can be pre-allocated for RN handover. This may be done, for example, through X2 interface negotiations between the DeNBs or through an initial pre-configuration.

Alternatively, when the mobile RN first connects with the source DeNB, the source DeNB may start a handover preparation procedure with possible neighboring DeNBs. The possible target DeNBs then allocate the C-RNTI and the dedicated RACH preambles for the potential coming RN handover.

Further, the possible target DeNBs may prepare the radio resource. The target DeNB 1516 radio resource information and security configuration may be forwarded to the source DeNB before the handover occurs. Such radio resource information may include the MobilityControlInfoIE. The security configuration may be the SecurityConfigHO information element.

Once the source DeNB 1514 receives the measurement report from the RN, it sends out the handover command to the RN using the stored mobility control information while sending the handover request message to the target DeNB at the same time. This enables the RN to access the target DeNB quickly without the source DeNB 1514 waiting for the handover request acknowledgement message.

For relay architecture alternatives 2, 3 and 4, additional functionalities such as the RN P-GW/S-GW, relay gateway, among others may need to be located at the target eNB 1516 to support the RN. With the existing handover procedures, source DeNB 1514 does not have knowledge of the neighboring eNB's RN support capability. Even if the target eNB 1516 does not have the capability of supporting the RN, the source DeNB will still request RN handover to that cell until the request is rejected. However, this results in an undesired handover delay. To avoid such inappropriate handover requests, the eNBs may be informed if the neighboring eNBs RN support capability. This may be done by providing a relay support indicator through the X2 setup request and X2 setup response messages to convey the information, for example.

In a further alternative embodiment, in order to realize fast RN handover, the RN may itself initiate the handover process by directly accessing the target DeNB after sending the measurement report. To enable the RN to access the target DeNB, the source DeNB may send configuration parameters such as mobility control information and security configuration of the neighboring DeNBs to the RN before the RN accesses the target DeNB.

One or multiple dedicated RACH preambles and C-RNTIs for the RN may be reserved at all eNBs that plans to serve the RN. To minimize the packet loss, the source DeNB starts to buffer packets after it receives the measurement report from the RN.

Figure 16:
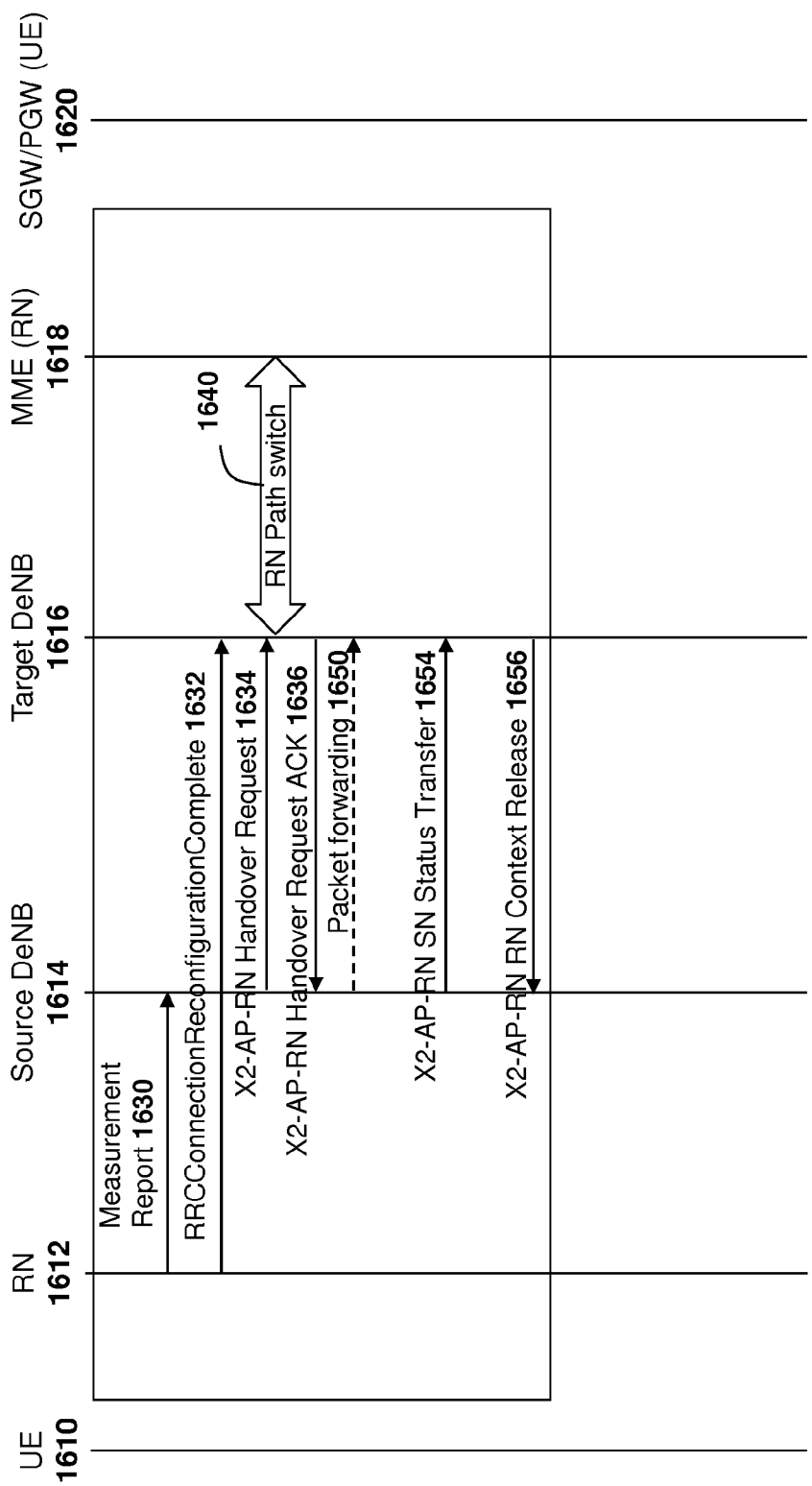
FIG. 16 is a flow diagram showing an RN initiated handover alternative embodiment.

Reference is now made to FIG. 16, in which the source DeNB sends the handover request message to the target DeNB after receiving the RN measurement report. The target DeNB may receive the handover complete message before receiving the handover request message with the RN initiated handover approach. In this case, the target DeNB may hold the received handover complete message until the handover request message arrives. To help the target DeNB to identify whether the received HO Request and handover complete messages are for the same RN, additional information may be included in the handover request and handover complete messages such as the source DeNB cell ID and RNC-RNTI in the source DeNB.

Thus, referring to FIG. 16, communication occurs between UE 1610, RN 1612, source DeNB 1614, target DeNB 1616, MME 1618 and S-GW/P-GW 1620.

The RN sends the measurement report, as shown by arrow 1630 and further sends an RRC connection reconfiguration complete message directly to target DeNB 1616, as shown by arrow 1632.

As a result of receiving the measurement report at arrow 1630, source DeNB 1614 sends the handover request, shown by arrow 1634 to target DeNB 1616 and target DeNB 1616 then sends a handover request acknowledgement, as shown by arrow 1636.

The RN path switch then occurs as shown by arrow 1640 and the remaining steps as illustrated above with regard to the first step of the handover are completed as described above. Namely, packet forwarding occurs, as shown at arrow 1650, the SN status transfer message is sent from source DeNB 1614 to target DeNB 1616, shown by arrow 1654, and the target DeNB 1616 sends an RN context release message to source DeNB 1614, shown by arrow 1656

Unlike existing handover procedures, where the target eNB requests path switch after receiving the handover complete message from the UE, here the target DeNB 1616 requests the RN path switch as shown by arrow 1640 after receiving the handover request message from the source DeNB.

In a further alternative, when a mobile RN first connects with the source DeNB, the source DeNB could indicate to the next potential target DeNB through the X2 interface that a handover may soon occur. Thus, potential target DeNBs could prepare to receive RN initiated handovers such as the dedicated preambles and also prepare for the radio resource.

RN initiated handover reduces handover failure occurrence caused by fast degrading received signal from the source DeNB in a high speed scenario in some examples. In such a high speed scenario, handover failure is often incurred by the RN experiencing radio link failures with the serving DeNB before the handover command is issued.

Group Mobility Procedure

In the second and fourth alternatives described above, for the UEs under the RN, cell context information needs to be transferred from the source DeNB to the target DeNB. Additionally, the target DeNB may also need to request a UE path switch to switch the UE downlink GTP tunnel towards the target DeNB. Sending multiple handover requests in the path switch for each UE requires significant backhaul bandwidth. Instead of performing UE mobility procedures individually, in one embodiment the UE mobility may be handled as a group to avoid access handover signaling. Specifically, each handover has a handover overhead and thus grouping the handovers for the UEs would save some of that overhead.

Figure 17:
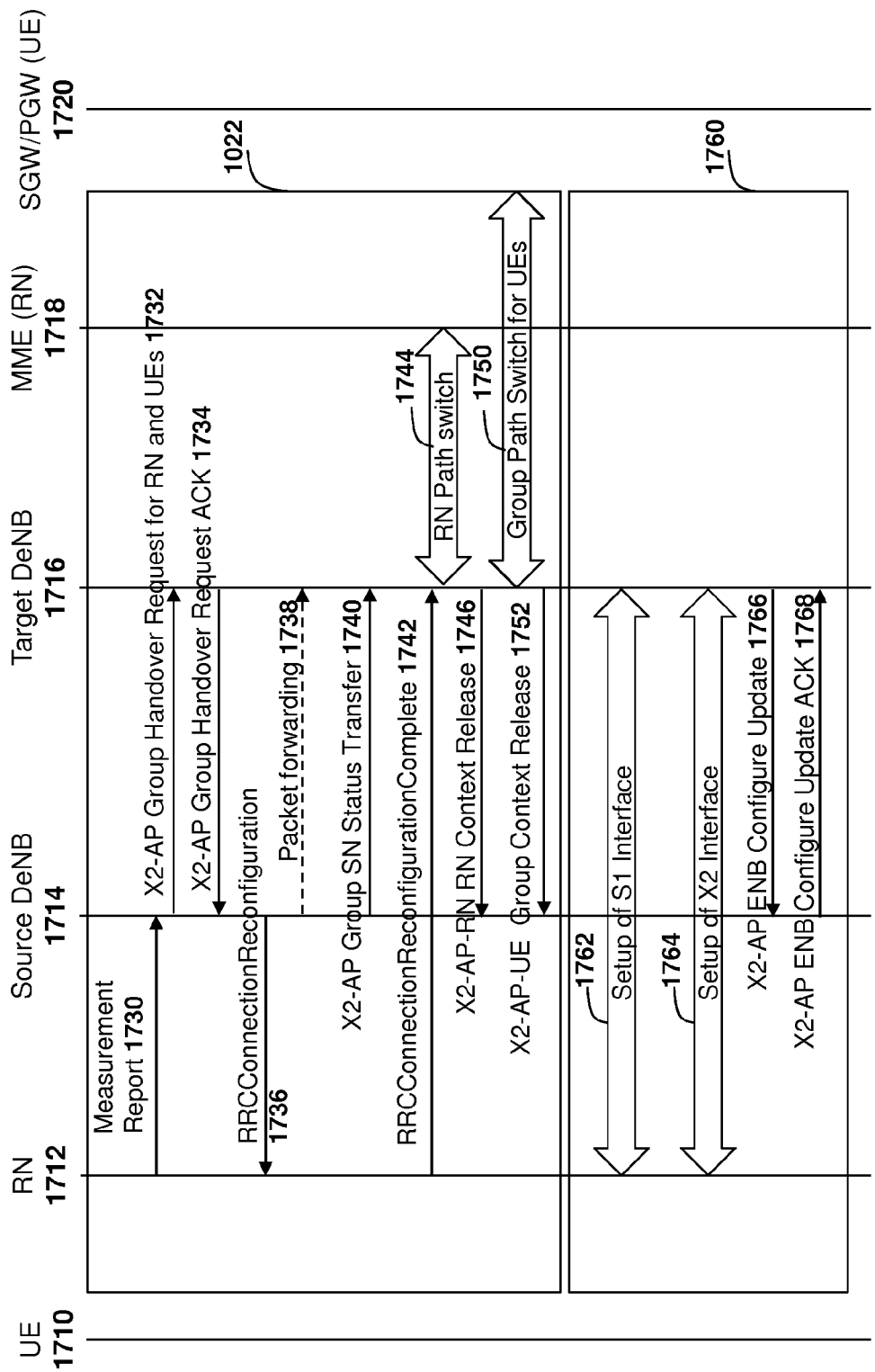
FIG. 17 is a flow diagram showing UE group mobility for RN handover.

Reference is now made to FIG. 17, in which communications occur between various ones of UE 1710, RN 1712, source DeNB 1714, target DeNB 1716, MME 1718, and S-GW/P-GW 1720.

In the embodiment of FIG. 17, RN 1712 sends a measurement report, shown by arrow 1730 to source DeNB 1714.

Source DeNB then sends the group handover request for the RN and all the UEs under that RN to target DeNB 1716. Such a group handover request is shown by arrow 1732. Thus, the handover request for the RNs and UEs are contained in one group handover request message. Correspondingly, the target DeNB then accepts or rejects on a per UE bearer in a group handover request acknowledgement message, shown by arrow 1734. The source DeNB 1714 could start forwarding UE packets afterwards.

Source DeNB 1714 then sends an RRC connection reconfiguration message to RN 1712, shown by arrow 1736, and starts the packet forwarding, shown by arrow 1738.

The source DeNB 1714 then sends a group SN status transfer for the RNs and the UEs to target DeNB 1716, shown by arrow 1740.

The RN 1712 can then send an RRC connection reconfiguration complete to target DeNB 1716, as shown by arrow 1742, and the RN path switch can occur subsequently between the target DeNB and the MME 1718, as shown by arrow 1744.

Target DeNB further sends an RN context release to source DeNB 1714, as shown by arrow 1746, and then a group path switch occurs between target DeNB 1716 and the S-GW/P-GW 1720, as shown by arrow 1750.

The target DeNB then can send a group context release for the UEs, shown by arrow 1752, to source DeNB 1714.

The embodiment of FIG. 17 has the same second stage shown by box 1760 as described above. Specifically, the S1 interface is setup, shown by arrow 1762, and then the X2 interface is setup, shown by arrow 1764. Subsequently, target DeNB 1716 sends an eNB configuration update message to source DeNB 1714, shown by arrow 1766. Source DeNB 1714 then sends an eNB configuration update acknowledgement, shown by arrow 1768.

Thus, in accordance with FIG. 17, after the RN is successfully attached to the target DeNB as a UE, the target DeNB requests the RN path switch as well as UEs path switch. UEs belonging to the same MME can be included in one group path switch request message instead of requesting the path switch for each UE individually. When the path switch request acknowledgement for the RN and UEs is received at the target DeNB, the target DeNB notifies the source DeNB to release the RN context and UE context. The group path switch acknowledgement message and group context release message can also be used to facilitate the UE group mobility.

After the RN establishes the S1/X2 interface with target DeNB, the RN handover and group mobility procedure is further completed.

In one embodiment, the steps of box 1760 can be processed in parallel with the RN/UE path switch in order to further reduce handover latency.

From FIG. 17, handover messages that may be enhanced to modify the group mobility procedures are: the handover request message; handover request acknowledgement message; SN status transfer message; path switch request message; path switch request acknowledgement message; UE context release message; handover complete message if handover complete message is used to include UE contexts.

These messages can be sent in the form of group message which contains multiple UE information.

By encapsulating mobile UEs information in one group message, the handover procedure is simplified and thereby the network nodes are operated in an efficient manner. Network signaling overhead as well as signaling delay may be reduced as a result of the simplified procedure.

RN Group Mobility

Further, in some embodiments such as in a high speed train scenario, multiple RNs may be included within one train. For example, one relay may serve one carriage in such a deployment scenario. It accordance with the above deployment, the set of RNs move together. This characteristic can be taken advantage of in a handover design as well. For example, the control plane handover steps do not necessarily need to be repeated N times, one for each RN. Rather, common steps may be performed by a single lead relay node on behalf of the entire RN group.

The above may be done by assigning a group identifier to the RN group. Generally, a lead RN may be the first RN in the moving direction. In order to ensure robust connections during handover, a backup RN may be assigned to perform the handover procedure in case the lead RN fails. In the case that the mobile relays are deployed on high speed train, for example, the RN group could be formed for the RNs that are located on adjacent carriages. Multiple RN groups may be formed for longer trains with a number of carriages.

Alternatively, the DeNB may act as an anchor node for the RN group handover. One RN in the RN group may need to send measurement reports to the DeNB. As the DeNB receives the measurement reports, it sends the group handover request message to the target DeNB, including the RN context for all RNs in the RN group.

Correspondingly, the target DeNB would include the handover command for all RNs in the RN group in the handover request acknowledgement message.

The handover command may be sent to the RN's using the group identifiers so that the RNs in the same group would receive the handover command at the same time. Further, one dedicated random access preamble may be assigned to the RN group to be shared among the RNs. The RNs can use the same dedicated random access preamble but perform random access channel communications at different timing offsets.

The above has the benefit of reducing over-the-air traffic and control-plan signaling. The grouping of the RNs also saves resources such as reserved dedicated random access preambles. In the user-plane, data forwarded for each individual RNs UE data would still be done individually.

The above may be implemented by any network element. A simplified network element is shown with regard to FIG. 18.

Figure 18:
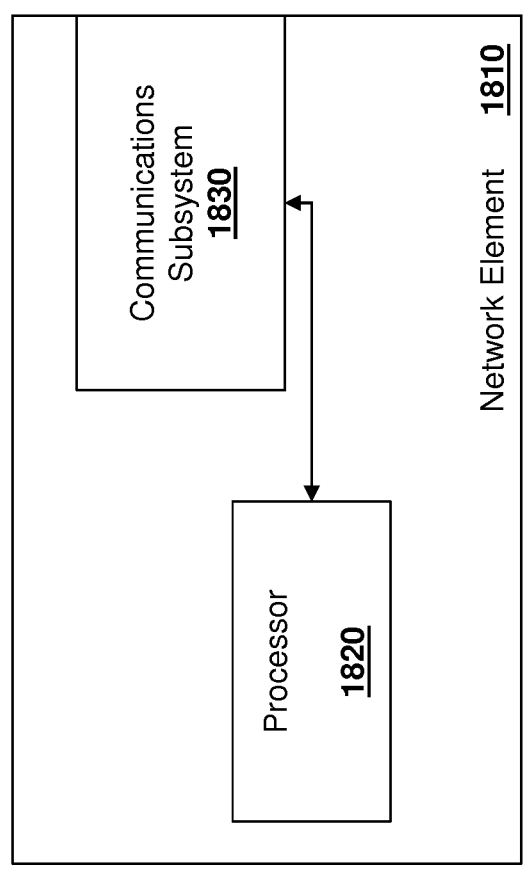
FIG. 18 is a simplified block diagram of an example network element.

In FIG. 18, network element 1810 includes a processor 1820 and a communications subsystem 1830, where the processor 1820 and communications subsystem 1830 cooperate to perform the methods described above.

Further, the above may be implemented by any UE. One exemplary device is described below with regard to FIG. 19.

UE 1900 is typically a two-way wireless communication device having voice and data communication capabilities. UE 1900 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1900 is enabled for two-way communication, it may incorporate a communication subsystem 1911, including both a receiver 1912 and a transmitter 1914, as well as associated components such as one or more antenna elements 1916 and 1918, local oscillators (LOs) 1913, and a processing module such as a digital signal processor (DSP) 1920. As will be apparent to those skilled in the field of communications, the particular design of the communication subsystem 1911 will be dependent upon the communication network in which the device is intended to operate. The radio frequency front end of communication subsystem 1911 can be any of the embodiments described above.

Network access requirements will also vary depending upon the type of network 1919. In some networks network access is associated with a subscriber or user of UE 1900. A UE may require a removable user identity module (RUIM) or a subscriber identity module (SIM) card in order to operate on a CDMA network. The SIM/RUIM interface 1944 is normally similar to a card-slot into which a SIM/RUIM card can be inserted and ejected. The SIM/RUIM card can have memory and hold many key configurations 1951, and other information 1953 such as identification, and subscriber related information.

Figure 19:
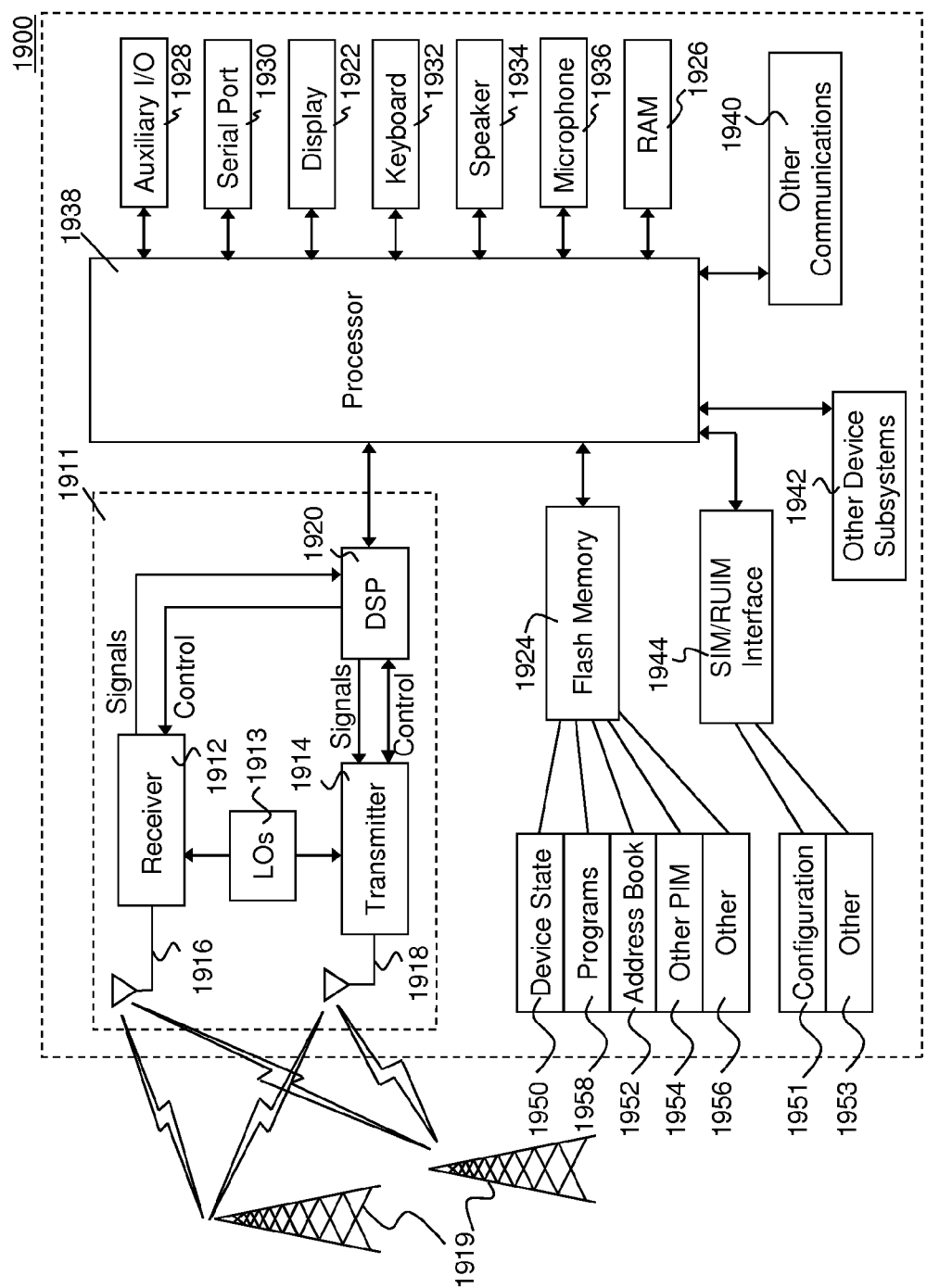
FIG. 19 is a block diagram of an example user equipment.

When required network registration or activation procedures have been completed, UE 1900 may send and receive communication signals over the network 1919. As illustrated in FIG. 19, network 1919 can consist of multiple base stations communicating with the UE.

Signals received by antenna 1916 through communication network 1919 are input to receiver 1912, which may perform such common receiver functions as signal amplification, frequency down conversion, filtering, channel selection and the like. A/D conversion of a received signal allows more complex communication functions such as demodulation and decoding to be performed in the DSP 1920. In a similar manner, signals to be transmitted are processed, including modulation and encoding for example, by DSP 1920 and input to transmitter 1914 for digital to analog conversion, frequency up conversion, filtering, amplification and transmission over the communication network 1919 via antenna 1918. DSP 1920 not only processes communication signals, but also provides for receiver and transmitter control. For example, the gains applied to communication signals in receiver 1912 and transmitter 1914 may be adaptively controlled through automatic gain control algorithms implemented in DSP 1920.

UE 1900 generally includes a processor 1938 which controls the overall operation of the device. Communication functions, including data and voice communications, are performed through communication subsystem 1911. Processor 1938 also interacts with further device subsystems such as the display 1922, flash memory 1924, random access memory (RAM) 1926, auxiliary input/output (I/O) subsystems 1928, serial port 1930, one or more keyboards or keypads 1932, speaker 1934, microphone 1936, other communication subsystem 1940 such as a short-range communications subsystem and any other device subsystems generally designated as 1942. Serial port 1930 could include a USB port or other port known to those in the art.

Some of the subsystems shown in FIG. 19 perform communication-related functions, whereas other subsystems may provide "resident" or on-device functions. Notably, some subsystems, such as keyboard 1932 and display 1922, for example, may be used for both communication-related functions, such as entering a text message for transmission over a communication network, and device-resident functions such as a calculator or task list.

Operating system software used by the processor 1938 may be stored in a persistent store such as flash memory 1924, which may instead be a read-only memory (ROM) or similar storage element (not shown). Those skilled in the art will appreciate that the operating system, specific device applications, or parts thereof, may be temporarily loaded into a volatile memory such as RAM 1926. Received communication signals may also be stored in RAM 1926.

As shown, flash memory 1924 can be segregated into different areas for both computer programs 1958 and program data storage 1950, 1952, 1954 and 1956. These different storage types indicate that each program can allocate a portion of flash memory 1924 for their own data storage requirements. Processor 1938, in addition to its operating system functions, may enable execution of software applications on the UE. A predetermined set of applications that control basic operations, including at least data and voice communication applications for example, will normally be installed on UE 1900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1919. Further applications may also be loaded onto the UE 1900 through the network 1919, an auxiliary I/O subsystem 1928, serial port 1930, short-range communications subsystem 1940 or any other suitable subsystem 1942, and installed by a user in the RAM 1926 or a non-volatile store (not shown) for execution by the processor 1938. Such flexibility in application installation increases the functionality of the device and may provide enhanced on-device functions, communication-related functions, or both. For example, secure communication applications may enable electronic commerce functions and other such financial transactions to be performed using the UE 1900.

In a data communication mode, a received signal such as a text message or web page download will be processed by the communication subsystem 1911 and input to the processor 1938, which may further process the received signal for output to the display 1922, or alternatively to an auxiliary I/O device 1928.

A user of UE 1900 may also compose data items such as email messages for example, using the keyboard 1932, which may be a complete alphanumeric keyboard or telephone-type keypad, among others, in conjunction with the display 1922 and possibly an auxiliary I/O device 1928. Such composed items may then be transmitted over a communication network through the communication subsystem 1911.

For voice communications, overall operation of UE 1900 is similar, except that received signals would typically be output to a speaker 1934 and signals for transmission would be generated by a microphone 1936. Alternative voice or audio I/O subsystems, such as a voice message recording subsystem, may also be implemented on UE 1900. Although voice or audio signal output is generally accomplished primarily through the speaker 1934, display 1922 may also be used to provide an indication of the identity of a calling party, the duration of a voice call, or other voice call related information for example.

Serial port 1930 in FIG. 19 would normally be implemented in a personal digital assistant (PDA)-type UE for which synchronization with a user's desktop computer (not shown) may be desirable, but is an optional device component. Such a port 1930 would enable a user to set preferences through an external device or software application and would extend the capabilities of UE 1900 by providing for information or software downloads to UE 1900 other than through a wireless communication network. The alternate download path may for example be used to load an encryption key onto the device through a direct and thus reliable and trusted connection to thereby enable secure device communication. As will be appreciated by those skilled in the art, serial port 1930 can further be used to connect the UE to a computer to act as a modem.

Other communications subsystems 1940, such as a short-range communications subsystem, is a further optional component which may provide for communication between UE 1900 and different systems or devices, which need not necessarily be similar devices. For example, the subsystem 1940 may include an infrared device and associated circuits and components or a Bluetooth™ communication module to provide for communication with similarly enabled systems and devices. Subsystem 1940 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for managing a plurality of relay nodes that is moving relative to a source network node, the method comprising:
   selecting a lead node;
   connecting the plurality of relay nodes to the lead node; and
   transmitting a signal to manage mobility of the plurality of relay nodes from the lead node to a network node;
   wherein the signal to manage mobility comprises at least one of:
   a measurement report;
   a request to initiate a handover;
   a random access signal;
   an RRC connection signal; receiving at a relay node selecting from the plurality of relay nodes, parameters of a target network node from the source node; initiating an attachment of the relay node to the target network node; and detaching the relay node from the source node.

2. The method of claim 1, wherein the lead node is a relay node with user equipments (UEs) attached to it.

3. The method of claim 1, wherein the lead node is a dedicated relay node without user equipments (UEs) attached to it.

4. The method of claim 1, wherein the plurality of relay nodes are wirelessly connected to the lead node.

5. The method of claim 1, wherein the plurality of relay nodes are connected to the lead node via a wire.

6. The method of claim 1, wherein the network node is a source network node.

7. The method of claim 1, wherein the network node is a target network node.

8. A first relay node, comprising:
a processor; and
a communications subsystem,
wherein the processor and communications subsystem cooperate to:
   connect to one or more secondary relay nodes; and
   transmit a signal from the first relay node to a network node to manage mobility of the one or more secondary relay nodes;
wherein the signal to manage mobility comprises at least one of:
   a measurement report;
   a request to initiate a handover;
   a random access signal;
   an RRC connection signal; receive, at the first relay node, parameters of a target network node from a source network node; initiate an attachment of the first relay node to the target network node; and detach the first relay node from the source network node.

9. The first relay node of claim 8, wherein the first relay node has user equipments (UEs) attached to it.

10. The first relay node of claim 8, wherein the first relay node is a dedicated lead relay node without user equipments (UEs) attached to it.

11. The first relay node of claim 8, wherein the one or more secondary relay nodes are wirelessly connected to the first relay node.

12. The first relay node of claim 8, wherein the one or more secondary relay nodes are connected to the first relay node via a wire.

13. The first relay node of claim 8, wherein the network node is the source network node.

14. The first relay node of claim 8, wherein the network node is a target network node.

* * * * *